United States Patent
Yang et al.

(10) Patent No.: US 10,952,014 B2
(45) Date of Patent: Mar. 16, 2021

(54) SYSTEM FOR PROVIDING LOCATION INFORMATION AND ELECTRONIC DEVICE AND METHOD SUPPORTING THE SAME

(71) Applicant: Samsung Electronics Co., Ltd., Gyeonggi-do (KR)

(72) Inventors: Jong-Eun Yang, Seoul (KR); Jinho Moon, Gyeonggi-do (KR); Ga-Jin Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/844,970

(22) Filed: Dec. 18, 2017

(65) Prior Publication Data

US 2018/0184240 A1 Jun. 28, 2018

(30) Foreign Application Priority Data

Dec. 23, 2016 (KR) .................. 10-2016-0178280

(51) Int. Cl.
*H04W 4/021* (2018.01)
*G06K 9/00* (2006.01)
(Continued)

(52) U.S. Cl.
CPC .......... *H04W 4/021* (2013.01); *G06K 9/0063* (2013.01); *G06K 9/00221* (2013.01);
(Continued)

(58) Field of Classification Search
CPC . H04W 4/021; G06K 9/0063; G06K 9/00221; G06Q 30/0629; G06Q 30/0639;
(Continued)

(56) References Cited

U.S. PATENT DOCUMENTS

| 2005/0053159 A1* | 3/2005 | Sugimoto .......... H04N 21/4325 375/240.26 |
| 2007/0005419 A1* | 1/2007 | Horvitz .................. G06Q 30/02 701/533 |

(Continued)

FOREIGN PATENT DOCUMENTS

| EP | 1 460 586 A2 | 9/2004 |
| JP | 5344547 B2 | 11/2013 |

(Continued)

OTHER PUBLICATIONS

European Search Report dated Feb. 16, 2018.
European Search Report dated Jan. 9, 2020.

*Primary Examiner* — John W Lee
(74) *Attorney, Agent, or Firm* — Cha & Reiter, LLC.

(57) ABSTRACT

A system for providing location information and an electronic device supporting the same are provided. The system includes a network interface, at least one processor, and at least one storage device. The storage device may store instructions of enabling the processor to, at its execution, execute receiving, through the network interface, a plurality of photographs including one or more objects, together with position information associated with the photographs, identifying the one or more objects from the plurality of photographs, and transmitting information on the identified one or more objects to an external device, in relation with the position information.

13 Claims, 27 Drawing Sheets

(51) Int. Cl.
  *G06Q 30/06* (2012.01)
  *G01S 19/42* (2010.01)
  *G06F 21/62* (2013.01)
  *H04L 29/08* (2006.01)

(52) U.S. Cl.
  CPC ..... *G06Q 30/0629* (2013.01); *G06Q 30/0631* (2013.01); *G06Q 30/0639* (2013.01); *G01S 19/42* (2013.01); *G06F 21/6254* (2013.01); *H04L 67/10* (2013.01)

(58) Field of Classification Search
  CPC ..... G06Q 30/0631; H04L 67/10; G01S 19/42; G06F 21/6254
  See application file for complete search history.

(56) References Cited

U.S. PATENT DOCUMENTS

| | | |
|---|---|---|
| 2008/0174676 A1 | 7/2008 | Squilla et al. |
| 2009/0055093 A1 | 2/2009 | Hamilton et al. |
| 2010/0312609 A1 | 12/2010 | Epshtein et al. |
| 2012/0308077 A1* | 12/2012 | Tseng .................. G06F 16/532 382/103 |
| 2014/0025747 A1* | 1/2014 | Sarkar .................. H04W 4/21 709/204 |
| 2015/0350349 A1* | 12/2015 | Kao .................. H04L 67/18 709/204 |

FOREIGN PATENT DOCUMENTS

| | | |
|---|---|---|
| KR | 10-2015-0000026 A | 1/2015 |
| KR | 10-1628108 B1 | 6/2016 |

* cited by examiner

SYSTEM FOR PROVIDING LOCATION INFORMATION AND ELECTRONIC DEVICE AND METHOD SUPPORTING THE SAME

CLAIM OF PRIORITY

This application claims priority under 35 U.S.C. § 119(a) to a Korean Patent Application entitled "SYSTEM FOR PROVIDING LOCATION INFORMATION AND ELECTRONIC DEVICE AND METHOD SUPPORTING THE SAME" filed in the Korean Intellectual Property Office on "Dec. 23, 2016." and assigned Serial No. "10-2016-0178280", the contents of which are herein incorporated by reference.

BACKGROUND

1. Field of the Disclosure

Various exemplary embodiments of the present disclosure relate to a system for providing location information and an electronic device and method supporting the same.

2. Description of the Related Art

As performance of portable electronic devices such as smartphones has increasingly gotten better, more and more services are being provided through these electronic devices. Specifically, aside from traditional services such as making phone calls, sending text messages, etc., additional and complex services such as games, messaging, document editing, image/video playing and editing, etc. have been provided in the electronic devices.

Also, with the development of image recognition and photograph analysis technologies, a variety of services based on image and photograph analysis are being developed. For example, if a user transmits an image needing analysis to a server, the server can analyze facial images included in the image and determine an age, a gender, etc. of the captured face.

Further, the server can generate a profile suitable to the individual identified through the image analysis, and can provide location information to the user based on the generated profile.

SUMMARY

A system providing location recommendation information provides location recommendation information that a service provider has determined as being suitable based on a user's profile. That is, since the system provides only information relevant to the user's profile, provisions of unnecessary information may be avoided.

Various exemplary embodiments of the present disclosure may provide a method and apparatus for providing a variety of information that includes information on a location where an electronic device is positioned.

Various exemplary embodiments of the present disclosure may provide a method and apparatus for providing optimal recommended location data to a user based on a profile of the user and other users who have profiles similar with the profile of the user and have actually visited the locations.

Embodiment disclosed herein are for illustrative purposes only, and other technological solutions not explicitly disclosed but are within the spirit of the disclosure may be clearly understood by a person having ordinary skill in the art from the following disclosure.

A system according to one exemplary embodiment of the present disclosure may include a network interface, at least one processor, and at least one storage device. The storage device may store instructions that enables the processor to receive, through the network interface, a plurality of photographs capturing one or more objects and position information associated with each of the plurality of photographs, identify the one or more objects from the plurality of photographs, and transmit information on the identified one or more objects and the position information to an external device.

A system according to one exemplary embodiment of the present disclosure may include a network interface, at least one processor, and at least one storage device. The storage device may store instructions that enabled the processor to receive profile information of a user through the network interface, at least temporarily store the profile information, receive, through the network interface, user request data requesting a location recommendation for the user, compare information on one or more objects, provided from an external device, with at least a portion of the profile information, generate the location recommendation based on the comparison and the user request data, and provide the location recommendation to the user through the network interface.

An electronic device according to one exemplary embodiment of the present disclosure may include a display displaying a user interface, a network interface configured to communicate with an external server, at least one processor electrically coupled with the display and the network interface, and at least one storage device electrically connected with the processor. The storage device may store instructions that enable the processor to determine profile information of a user based on at least one photograph captured by the user, at least temporarily store the profile information in the at least one storage device, receive a request on location recommendation from the user through the user interface, in response to the request, generate user request data to be transmitted to the external server, where the user request data is generated at least partially based on the profile information of the user, transmit the generated user request data to the external server through the network interface, receive a recommendation from the external server through the network interface, where the recommendation is related to the transmitted user request data, and provide the received recommendation to the user through the user interface.

A method for operating in an electronic device according to one exemplary embodiment of the present disclosure may include capturing at least one photograph, determining profile information of a user based on the at least one photograph, at least temporarily storing the profile information of the user in at least one storage device, receiving a request on location recommendation from the user through a user interface, in response to the request, generating user request data to be transmitted to an external server, where the user request data is generated at least partially based on the profile information of the user, transmitting the generated user request data to the external server through a network interface, receiving a recommendation from the external server through the network interface, where the recommendation is related to the transmitted user request data, and providing the received recommendation to the user through the user interface.

DETAILED DESCRIPTION

Figure 1:
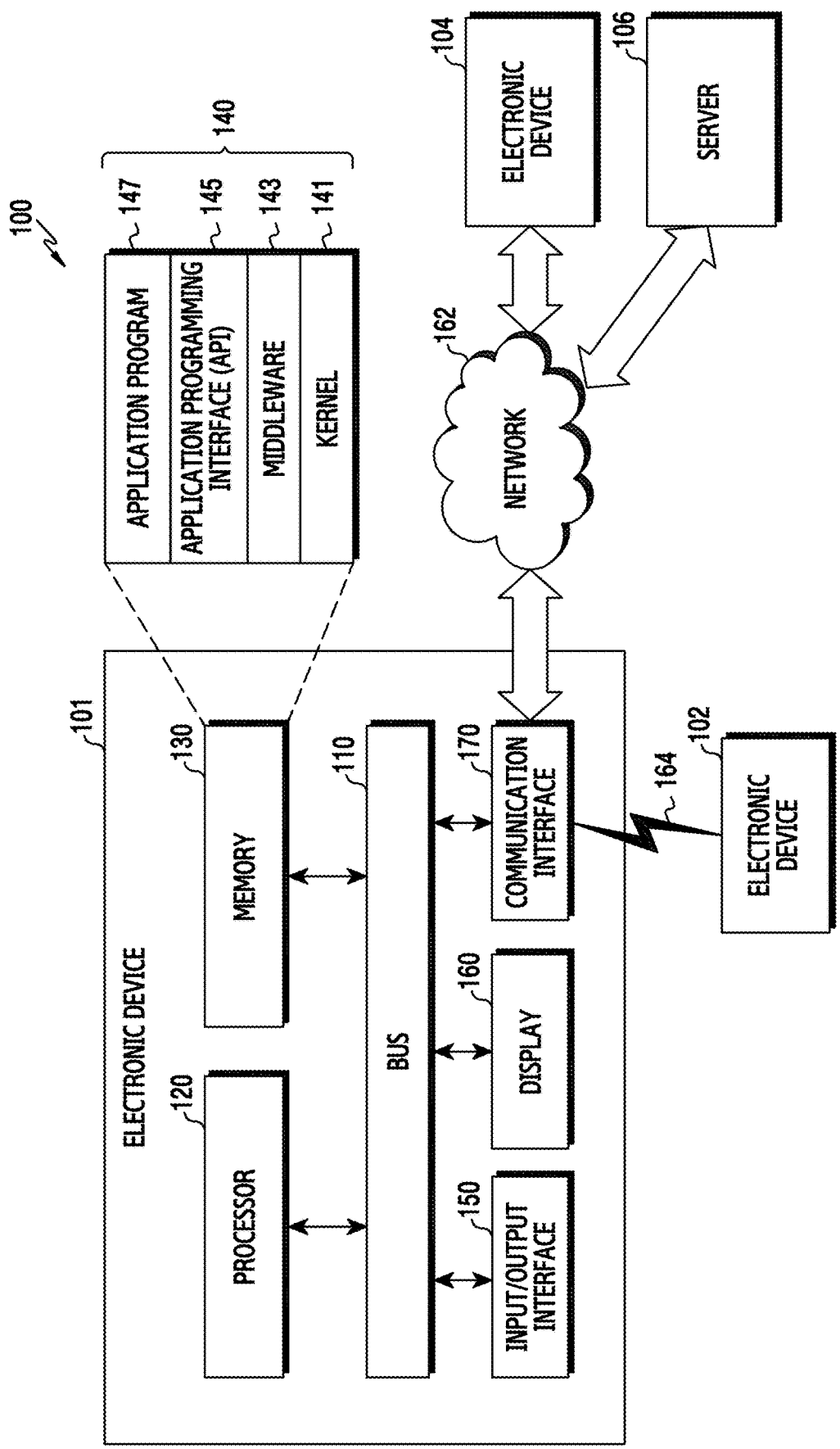
FIG. 1 illustrates an environment of a network according to one embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the external electronic device 102 or 104, or the server 106). To perform a function or service automatically or by request, instead of performing the function or the service by the electronic device 101, the electronic device 101 can request at least part of a function relating thereto from another device (e.g., the external electronic device 102 or 104, or the server 106). The other electronic device (e.g., the external electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
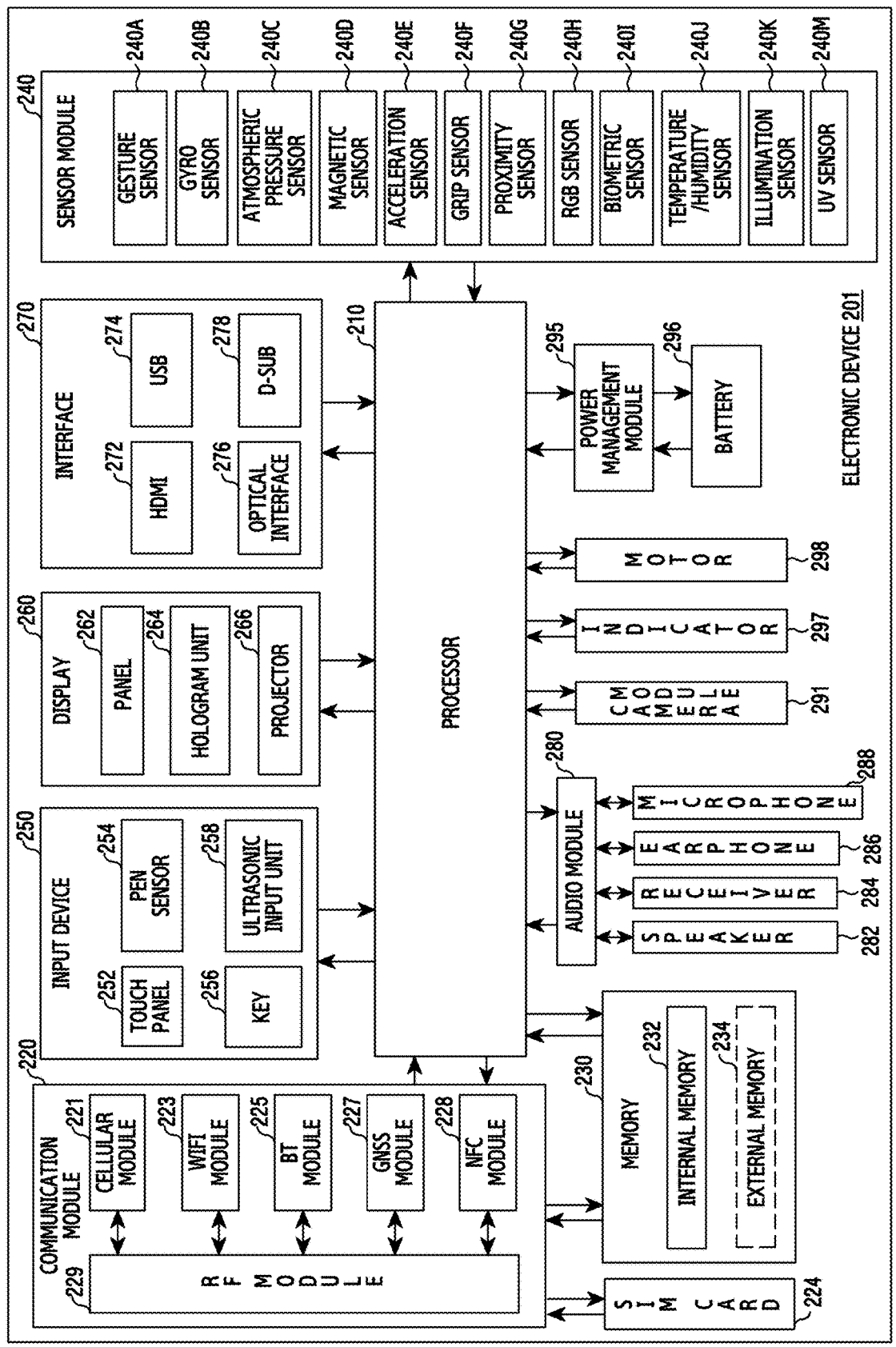
FIG. 2 illustrates a block diagram of an electronic device according to one embodiment of the present disclosure.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternatively, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
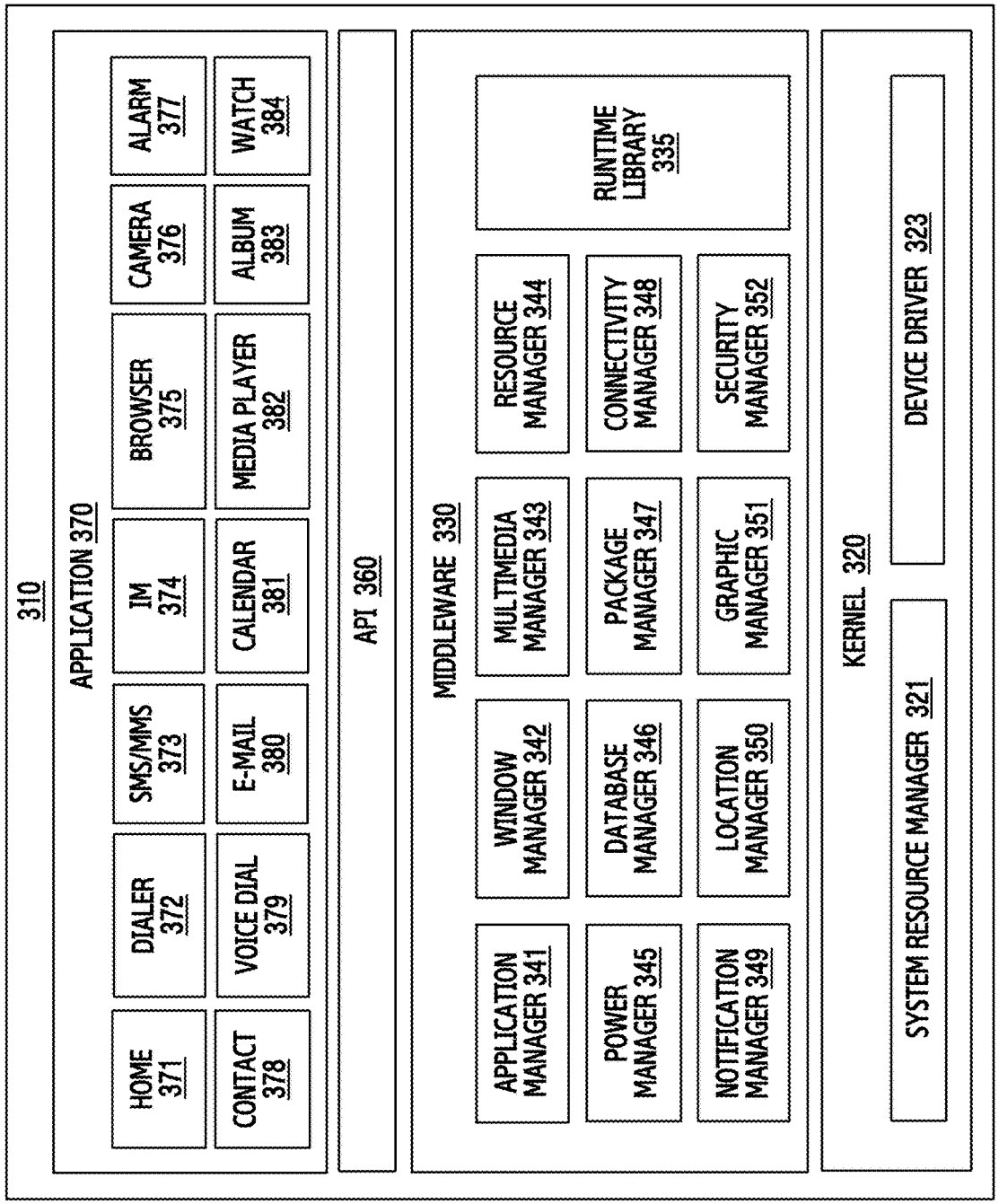
FIG. 3 illustrates a block diagram of a program module according to one embodiment of the present disclosure.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the external electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manager 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4A:
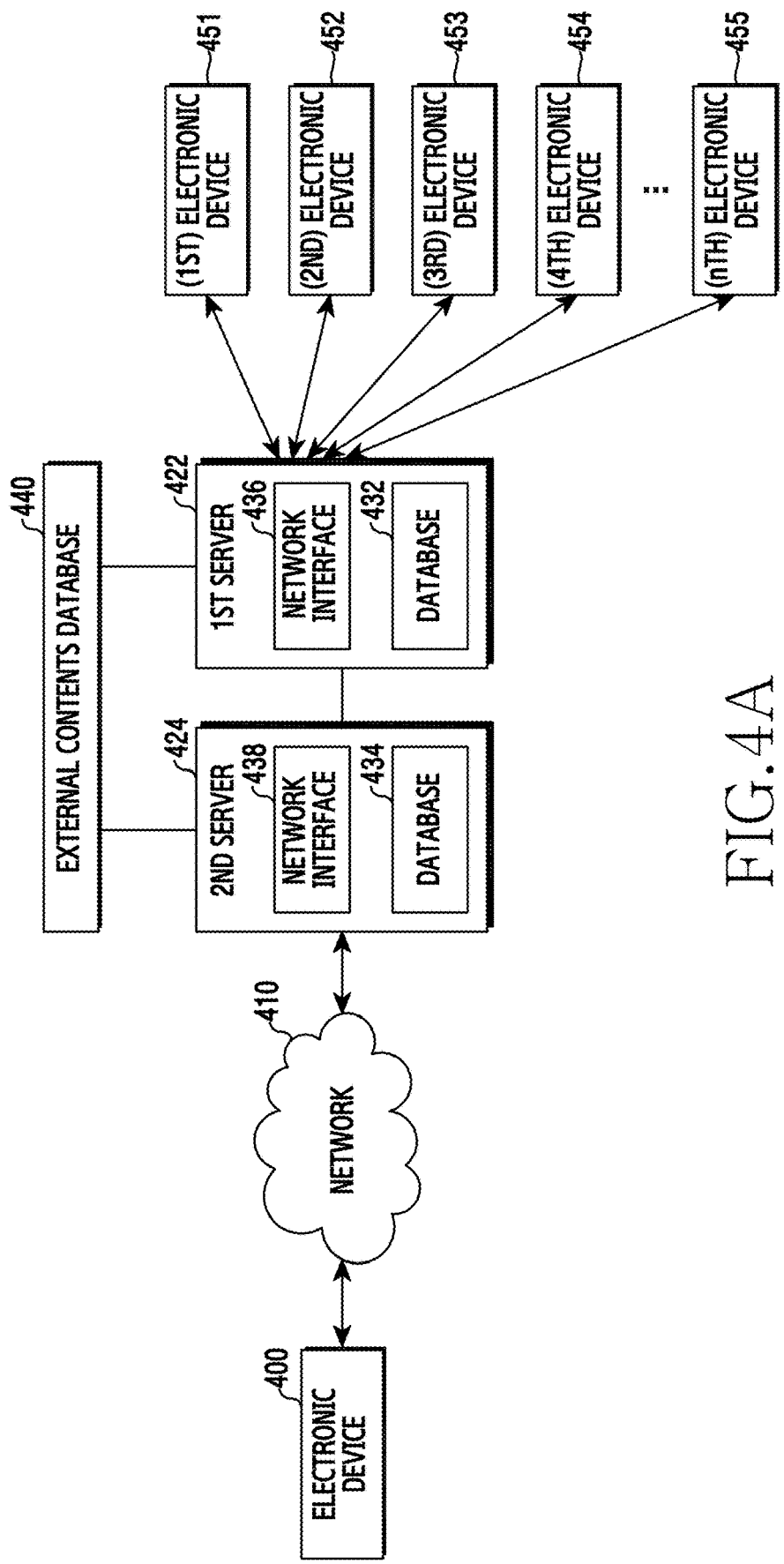
FIG. 4A and FIG. 4B illustrate an electronic device and a server according to one embodiment of the present disclosure.
Figure 4B:
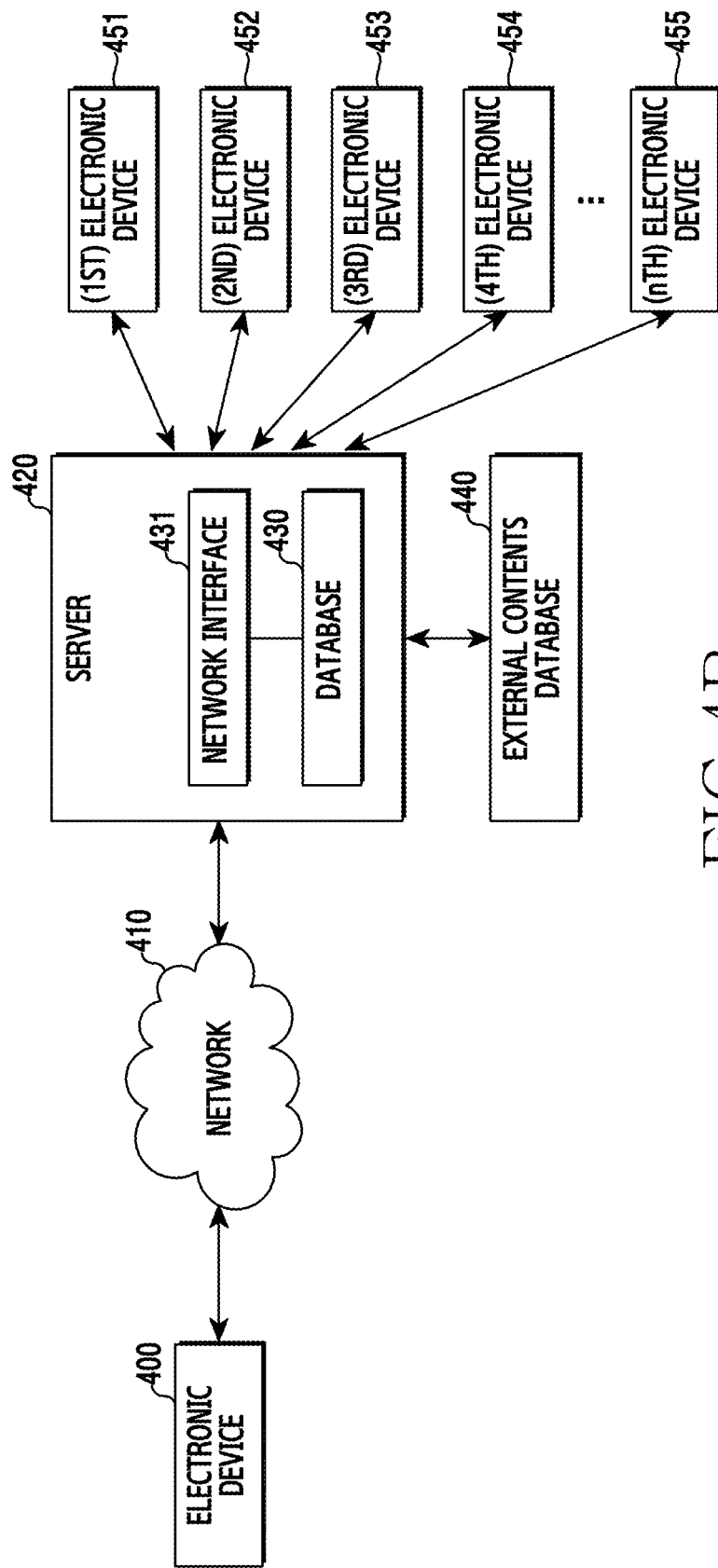

FIGS. 4A and 4B illustrate an electronic device and a server according to one embodiment of the present disclosure.

Referring to FIG. 4A, in an exemplary embodiment, the electronic device 400 may be a user device which transmits user request data for location recommendation to a second server 424. The electronic device 400 may then in turn receive recommended location data responsive to the user request data from the second server 424. In an exemplary embodiment, the electronic device 400 may be the electronic device 101 of FIG. 1.

In an exemplary embodiment, the second server 424 may be a device which receives user request data for location recommendation from the electronic device 400. The second server 424 may then extract, from a database 434, recommended location data corresponding to the user request data and provides the same to the electronic device 400. In one exemplary embodiment, the second server 424 may be the electronic device 101 of FIG. 1. In another exemplary embodiment, the second server 424 may include a network interface 438 (e.g., the communication module 220 or the communication interface 170) for communicating with any one of the electronic device 400 and/or a first server 422.

In the same exemplary embodiment, the first server 422 may include a network interface 436 for communicating with any one of a plurality of electronic devices 451 to 455 and/or the second server 424. The first server 422 may also include an image analysis module for analyzing images received from the plurality of electronic devices 451 to 455. In one exemplary embodiment, each of the first server 422 and the plurality of electronic devices 451 to 455 may be the electronic device 101 of FIG. 1. The first server 422 may be a server which receives, from the plurality of electronic devices 451 to 455, photographs that were shot by the plurality of electronic devices 451 to 455. The first server 422 may then analyze the received photographs to extract data to be stored in a database 432, and provide the extracted data to the second server 424. In one exemplary embodiment, the data to be stored in the database 432 may be anonymized. The details of anonymizing the data are described below.

The particular operations of the embodiment are as follows. The first server 422 may receive, from the plurality of electronic devices 451 to 455, one or more photographs the plurality of electronic devices 451 to 455. Alternatively, the first server 422 may receive information on contexts related with the photographs. In an exemplary embodiment, the context information may include information regarding the surrounding or environment of the electronic devices 451 to 455, at the time when the electronic devices 451 to 455 captured the photographs. For example, the context information may include weather information, temperature information, humidity information, location information of the electronic devices 451 to 455 when the electronic devices 451 to 455 took the photographs. The electronic devices 451 to 455 may acquire the context information through a communication circuit or a sensor. In another exemplary embodiment, the electronic devices 451 to 455 may acquire the context information (e.g., weather information) through an application (e.g., a weather widget) that executed in the electronic devices 451 to 455.

The first server 422 may identify one or more objects in one or more photographs received from the plurality of electronic devices 451 to 455, and generate information on the objects. In an exemplary embodiment, the one or more objects may be the intended targets of the photographs, such as the subjects of the photographs. For example, the one or more objects may include persons, faces of persons, buildings, animals, plants, etc. The information on the object may be information indicating a feature of the object. For example, the information on the object may be the number of persons (e.g., two), age and gender of the person (e.g., 27-year-old male or 28-year-old female), and the like. In an exemplary embodiment, the information on the object may include personal information for identifying a person. For example, the personal information may include the name of the person (or an identifier of his or her associated device), the face of the person, the home address of the person, the occupation of the person, whether the person is married, the identity of the person's husband or wife, etc.

Herein, the context information of a particular photograph and the information on the object included in the particular photograph may be referred to as "data on the photograph."

The first server 422 may anonymize the data on the photographs. The anonymized data on the photographs may be generated by eliminating personal information from the data on the photographs.

The first server 422 may then transmit the generated anonymized data on the photographs to the second server 424.

The second server 424 may convert position information in the anonymized data on the photographs into point of interest (POI) information. In an exemplary embodiment, the position information in the anonymized data on the photographs may include latitude and longitude information. The POI information may be location information of a specific location where the photograph was taken. The second server 424 may convert the position information in the anonymized data on the photographs into a name for the specific location. For example, the second server 424 may convert position information expressed as latitude 37.242 and longitude of 127.06 into a specific location name such as "Gyeongbokgung." Alternatively, the second server 424 may convert the position information in the anonymized data into an address. The second server 424 may then store, in a POI database, the anonymized data, including the position information which has been converted into POI information. The POI database may be a part of the database 434.

In other embodiments, the operation of converting the position information of the anonymized data into POI information may be carried out by the first server 422 before the first server 422 transmits the anonymized data on the photographs to the second server 424, or by the first server 422 before the first server 422 generates the anonymized data on the photographs. The first server 422 may store the anonymized data on the photographs in the database 432.

The following description relates to when the electronic device 400 transmits user request data for location recommendation to the second server 424.

In an exemplary embodiment, in response to a request for location recommendation from its user, the electronic device 400 may generate user request data to be transmitted to the second server 424. The user request data may be at least partially based on user's profile information generated from one or more photographs taken by the user. The electronic device 400 then transmits the generated user request data to the second server 424. In an exemplary embodiment, the electronic device 400 may receive the request from the user as text input or as a voice command. In another exemplary embodiment, even if the request on location recommendation is not made explicitly and/or directly, the electronic device 400 may indirectly determine the request on location recommendation. For example, the electronic device 400 may scan a text conversation between the user and another companion and interpret the message "I'm hungry. Shall we visit to a restaurant?" as request on location recommendation.

In another exemplary embodiment, even though not receiving the request on location recommendation from the user, the electronic device 400 may automatically generate the request on location recommendation to be transmitted to the second server 424, in accordance with a predetermined setting value. For example, when a predetermined trigger event is detected during a navigation service, the electronic device 400 may automatically generate the request on location recommendation to be transmitted to the second server 424.

In response to the request on location recommendation received from the user, the electronic device 400 may generate user request data for location recommendation to be transmitted to the second server 424, where the user request data is based at least partially on the profile information of the user.

The user's profile information may include real-time profile information and base profile information. For example, the real-time profile information may be generated from a photograph that is contemporaneously captured by the electronic device 400. Base profile information, on the other hand, may be information that is not as transient, such as the user's age.

In an exemplary embodiment, the electronic device 400 may generate the real-time profile information based on one or more objects included in a photograph captured by the camera module 291 and/or the context related to the photograph. The real-time profile information may include information such as information on characteristics of a person in the photograph (e.g., gender, age, identity, etc.), information on weather (e.g., temperature, humidity, whether it is raining or not, etc.), information on location of the electronic device (e.g. GPS location), etc. When the photograph is a self-shot or selfie, the real-time profile information may include information on characteristics of the user, such as gender and age of the user. The items included in the real-time profile information may be identical with one or more items included in the base profile information. The electronic device 400 may automatically generate the real-time profile information in accordance with a user's input, or in accordance with a predetermined setting value when the user's input is not detected.

The electronic device 400 may generate the real-time profile information based on one or more objects included in the photograph captured by the electronic device 400. For example, the electronic device 400 may generate information on the weather surrounding the electronic device 400 when the photograph was shot, based on detecting a cloud, a shadow, sunlight, a raindrop, etc. in the photograph. For another example, the electronic device 400 may generate the real-time profile information based on the context related with the photograph. For example, the electronic device 400 may store context information for the photograph such as temperature information and humidity information of the environment of the electronic device 400 when the photograph was taken. The electronic device 400 may generate the real-time profile information from the stored context information.

The electronic device 400 may also generate base profile information. The base profile information may be based on call logs and photographs the user has previously shot. For example, when the number of times of making a call with a contact which is saved as "my son" is larger than a designated number of times (5 times) within a designated time range (i.e., from the present to the past 3 months), the electronic device may determine information on "family" (i.e., whether to have children) in the user's base profile. The electronic device 400 may automatically generate the base profile information in accordance with the user's input, or in accordance with a predetermined setting value when the user's input is not detected.

The base profile information may be information related to the user that is generated from multiple previously captured photographs. For example, the electronic device 400 may analyze multiple previously captured photographs and determine the user as a common subject in those photographs. The electronic device 400 may also detect a companion who is present in most of the photographs. That person may be determined to be the husband or wife of the user or the child of the user. Using the images of the user, the electronic device 400 may then determine the user's age, gender, whether the user's married and has children, etc.

An item included in a real-time profile may or may not correspond to an item included in a base profile. For example, weather information, which may be useful only when it is up to date, may be included in the real-time profile, but not in the base profile.

When values of corresponding items in the base profile information and the real-time profile information are different, the electronic device 400 may grant higher priority to the values in the real-time profile information. For example, when a subject in the photographs is identified in the real-time profile as "companion—30-year-old male, and relation information—friend," even though the base profile has determined the same subject to be "companion—5-year-old male, and relation information—family," that subject may be identified as a 30-year-old male friend.

The electronic device 400 may receive profile information for the user request data directly from a user as well. For example, the user may input into electronic device 400 current member information (e.g., the number of companions, relation information between the companion and the user, etc.).

The electronic device 400 may generate profile information using other log information included within the electronic device 400 as well. For example, the electronic device 400 may generate the profile information using log information from a sensor (e.g. temperature sensor) of the electronic device 400. In another exemplary embodiment, the electronic device 400 may generate the profile information using log information from another terminal.

The electronic device 400 may store the generated user's profile information in at least one storage device (e.g., the memory 130), and may transmit the generated user's profile information to the second server 424.

In an exemplary embodiment, the user request data transmitted to the second server 424 may include filtering data. The filtering data may be data indicating a criterion for extracting a recommended location from among the anonymized data on photographs.

The filtering data may include one or more items such as the user's characteristics (e.g., gender, age, family relations, etc.), information on weather (e.g., temperature, humidity, whether it is raining or not, etc.), information on a location (e.g., the business type at the location, etc.), information on a search range or the like. For example, when user's profile information is "age—30, gender—male, companion—31-year-old female, and relation information—wife," and the electronic device 400 has received a request on location recommendation such as "range—one km around Gyeongbokgung, and business type—restaurant," the electronic device 400 may determine user request data for location recommendation as "restaurant where an early 30's couple often goes, within a range of one kilometer (km) around the Gyeongbokgung."

As described above, the electronic device 400 may transmit the generated user request data for location recommendation to the second server 424.

The following description relates to the second server 424 providing recommended location data to the electronic device 400 in response to the received user request data for location recommendation.

In an exemplary embodiment, when the second server 424 receives user request data from the electronic device 400, the second server 424 may compare profile information of the user who has transmitted the user request data with information related to objects identified in photographs from electronic devices 451-455, and generate location recommendation based on the comparison result.

The second server 424 may check, in the database 434, the profile information of the user who has transmitted the user request data. In an exemplary embodiment, the database 434 may store the user's unique information (e.g., a user ID) and the user's profile information corresponding to the user's unique information. The unique information may uniquely identify the user (e.g. a unique alphanumeric string for each user) or the user's device (e.g. the MAC address of the device). When the second server 424 receives the user request data, the second server 424 may identify the user having transmitted the user request data using the unique information, and confirm the profile information of the identified user in the database 434.

The second server 424 may compare the confirmed user's profile information and the information related to objects identified in photographs from electronic devices 451-455. As explained above, the user's profile information may include information indicating the user's characteristic such as gender, age, family relation, etc. The information related to the identified objects stored in the database 434 may be information indicating characteristics of the objects. For example, for a particular photograph, the information related to the object may include the number of persons (e.g., two) in the photograph, age and gender of the persons (e.g., 27-year-old male or 28-year-old female) in the photograph, and the like.

By comparing the confirmed user's profile information and the information related to the identified objects, the second server 424 may determine one or more pieces of data matched with the user's profile information.

For example, the second server 424 may extract, from the database 434, one or more pieces of data matched with the user's profile information "user—25-year-old male, companion—24-year-old female, and relation information—couple." For example, the photographs from the electronic devices 451-455 may be taken at various restaurants where 20-something couples are the subjects of those photographs. Then in the database 434, the locations of those restaurants are associated with 20-something couples. Thus, when the user request data includes the user's profile information "user—25-year-old male, companion—24-year-old female, and relation information—couple," the second server 424 may match the locations of those restaurants to the user's profile information. In addition, the second server 424 may sort the locations of the restaurants by how often each restaurant is photographed. The second server 424 may determine, as recommended location data, at least a part of the extracted data. For example, the second server 424 may determine, as the recommended location data, locations of restaurants that have been visited five times or more.

In alternative embodiments, the second server 424 may determine recommended location data by searching one or more databases 434 included in the second server 424, or determine the recommended location data by searching an external contents database 440. The second server 424 may then provide the determined recommended location data to the electronic device 400.

The electronic device 400 may receive the recommended location data from the second server 424, and provide the same to a user.

In an exemplary embodiment, the first server 422 and the second server 424 may include databases 432 and 434, respectively. The anonymized data may be stored in the databases 432 and 434. The databases 432 and 434 may include separate storage spaces for the anonymized data and the users' profile information.

As explained above, the anonymized data may be acquired through analysis of objects captured in photographs. For example, for a particular photograph captured by electronic devices 451-455, the anonymized data may include the number of persons (e.g., two), age and gender of each person (e.g., 27-year-old male or 28-year-old female), information on weather (e.g., sunny), information on the location where the photograph was taken (e.g., a coordinate of 37.242 and 127.06), etc. The anonymized data may further include code or index information for distinguishing the anonymized data.

According to an exemplary embodiment, the anonymized data may be continuously updated as additional photographs are received from the plurality of electronic devices 451 to 455. The plurality of electronic devices 451 to 455 may include all devices that send photographs to the first server 422 using various services such as cloud services, online storage services, e-mail services, social network services (SNS), other Internet services, or the like. In an exemplary embodiment, the electronic device 400 may be included in the plurality of electronic devices 451 to 455.

The network 410 may be a telecommunications network. The telecommunications network may be, for example, a cellular network, a wireless local area network (LAN), a computer network, the Internet, or a telephone network.

According to an exemplary embodiment, the external contents database 440 may be connected with the first server 422 and the second server 424. The first server 422 or the second server 424 may generate data that will be included in the database 434 using content stored in the external contents database 440. For example, the external contents database 440 may store map content, weather content, SNS content such as restaurant reviews, etc. By searching the database 440 which stores weather information, the second server 424 may acquire weather information at a specific position and specific time, and may store that weather information in database 434 as weather information associated with the specific position and specific time.

Referring to FIG. 4B, in an exemplary embodiment, a server 420 may be a device which receives analyzed data of a plurality of electronic devices 451 to 455, from the plurality of electronic devices 451 to 455, and stores the analyzed data in a database 430. The analyzed data may be anonymized data on photographs captured by the plurality of electronic devices 451 to 455.

The server 420 may include a network interface 431 for communicating with the plurality of electronic devices 451 to 455 and the electronic device 400.

The server 420 may not include an image analysis module. When the server 420 does not have an image analysis module, and the plurality of electronic devices 451 to 455 may each include the image analysis module. Accordingly, the plurality of electronic devices 451 to 455 may each transmit, to the server 420, data from the analyses of photographs captured by the plurality of electronic devices 451 to 455, such as identification of objects in the photographs. In such cases, the plurality of electronic devices 451 to 455 may only transmit the analyzed data to the server 420 and not the photographs themselves.

Also, like the second server 424 of FIG. 4A, the server 420 may be a device which receives a location recommendation request from the electronic device 400. In response to the request, the server 420 may extract recommended location data corresponding to the request from the database 430 and provide the same to the electronic device 400.

In an exemplary embodiment, the server 420 may store the anonymized data on the photographs in the database 430. The anonymized data may include the location of an establishment (for example a restaurant) and information regarding visitors to the establishment.

The server 420 may convert location information of anonymized data on a photograph into a point of interest (POI) information. The location (or position) information of the anonymized data on the photographs may include latitude and longitude information. The POI information may be the name of the location corresponding to the location information. For example, the server 420 may convert position information expressed with a latitude of 37.242 and a longitude of 127.06 into the name of the specific location named 'Gyeongbokgung'. In another embodiment, the server 420 may convert the position information of the anonymized data into an address. The server 420 may then store, in a POI database, anonymized data, including the position information converted into POI information. The POI database may be a part of the database 430.

The server 420 may also identify objects such as persons in the photographs. For example, for a photograph captured at a restaurant, the server 420 may identify a 25-year old male and a 25-year old female in the photograph. The server 420 may then identify the 25-year old male and the 25-year old female as visitors to the restaurant.

The operation of FIG. 4B in which the electronic device 400 transmits user request data for location recommendation to the server 420, and the server 420 provides recommended location data to the electronic device 400 in response to the received user request data for location recommendation may be identical with the operation of FIG. 4A in which the electronic device 400 transmits user request data for location recommendation to the second server 424, and the second server 424 provides recommended location data to the electronic device 400 in response to the user request data and thus, the corresponding description is omitted.

The database 430 of FIG. 4B may be the same as the database 434 of FIG. 4A and thus, its description is omitted.

Figure 5A:
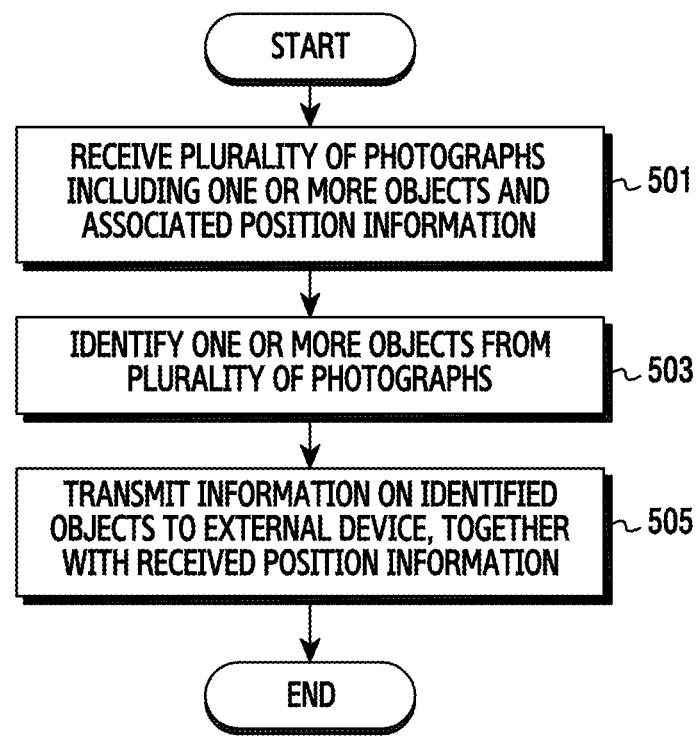
FIG. 5A is a flowchart illustrating a method of generating and transmitting, by a server, data on a photograph according to an exemplary embodiment of the present disclosure.

FIG. 5A is a flowchart illustrating a method of generating and transmitting, by a server, data on a photograph according to an exemplary embodiment of the present disclosure.

Below, to facilitate ease of description, the first server 422 is said to perform the operations of FIG. 5A. However, the present disclosure is not so limited.

Referring to FIG. 5A, in operation 501, the first server 422 may receive a plurality of photographs including one or more objects, and associated position information. The first server 422 may receive this information from at least one of the plurality of electronic devices 451 to 455. For example, the position information associated with the photographs may be location information of the electronic devices 451 to 455 when they capture the photographs.

In operation 503, the first server 422 may identify one or more objects from the plurality of photographs. In an exemplary embodiment, the one or more objects may be targets of the photographs or the subjects of the photographs. For example, the one or more objects may include persons, faces of persons, buildings, animals, plants, or the like. If persons or faces of persons are identified, the first server 422 may further identify other characteristics such as the number of persons present in the photograph, and the age and gender of each person.

In operation 505, the first server 422 may transmit, to an external device, information on the identified objects, together with the received position information. For example, the first server 422 may transmit, to the external device, information on an object included in a photograph and the position information of the photograph. The external device may be the second server 424.

Figure 5B:
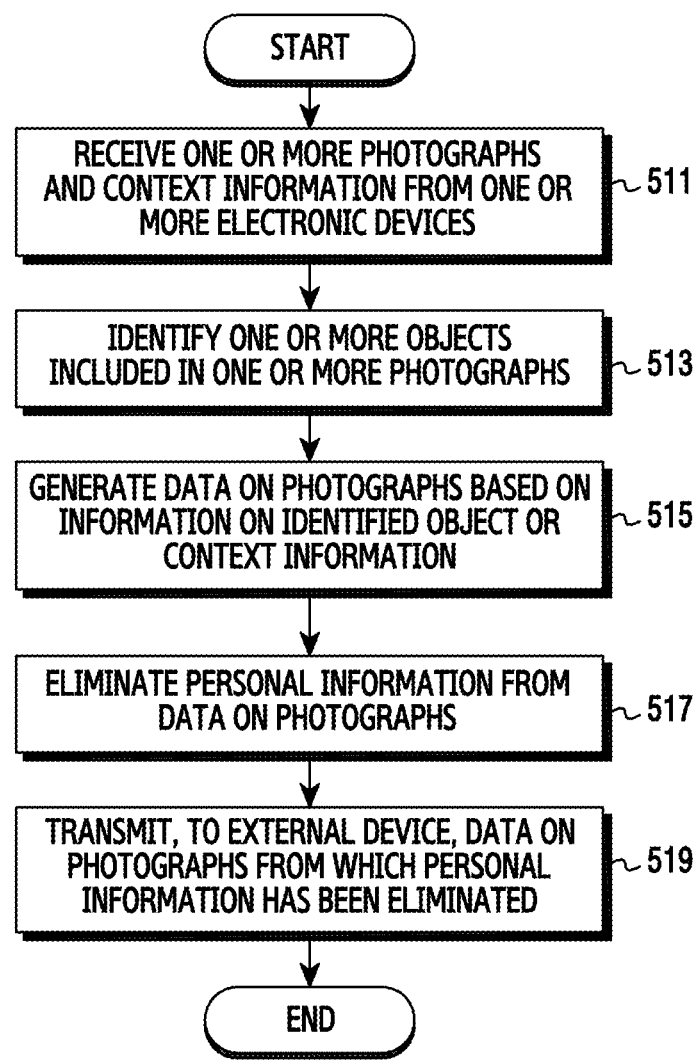
FIG. 5B is a flowchart illustrating a method of generating, by a server, anonymized data according to an exemplary embodiment of the present disclosure.

FIG. 5B is a flowchart illustrating a method of generating, by a server, anonymized data according to an exemplary embodiment of the present disclosure. Below, to facilitate ease of description, the first server 422 is said to perform the operations of FIG. 5B. However, the present disclosure is not so limited.

Referring to FIG. 5B, in operation 511, the first server 422 may receive one or more photographs and information on contexts related with the photographs, from at least one of the plurality of electronic devices 451 to 455. The context information may mean information related to the photographs at the times the photographs were taken. In an exemplary embodiment, the context information may include weather information, temperature information, humidity information, time information, location information. In another exemplary embodiment, the context information may include the metadata of the photographs such as the times the photographs were taken and the locations where the photographs were taken. The metadata may further include information such as the model names of the cameras that took the photographs, the focus distances of the photographs, the shutter speeds, the exposure adjustment, the iris diaphragm value, the ISO sensitivity, and the like. The location information may include latitude and longitude information. Based on the latitude and longitude information, for example, the first server 422 may identify the location of the photograph by name (e.g. the name of a shop or restaurant where the photograph was taken).

When a received photograph does not include metadata, the first server 422 may analyze the received photograph, thereby acquiring position information of the photograph. For example, the first server 422 may analyze an object included in the photograph to acquire position information. The first server 422 may extract features (e.g., contours, color, size, shape or the like) of the object and determine that for example the object is a known landmark having a known location. Accordingly, the first server 422 may assign the known location of the landmark (e.g., Namdaemun) to be the position information of the photograph.

In another embodiment, the first server 422 may determine the position of a received photograph by comparing it to other photographs. For example, the first server 422 may have previously received a photograph of an object (e.g. a restaurant), where the photograph is associated with its position information. When another photograph of the same object is received, the first server 422 may compare the object in the second photograph with the object in the first photograph. If the object is determined to the same object, e.g. the same restaurant, then the position information of the first photograph may be assigned to the second photograph.

In an exemplary embodiment, the first server 422 may assign different weights to the position information in accordance with accuracy. For example, position information embedded in the metadata may be assigned a first weight. Position information obtained by identifying a landmark may be assigned a lower weight.

The first server 422 may receive photographs and related context information from one or more electronic devices through the network interface 436 of the first server 422.

In operation 513, the first server 422 may identify one or more objects included in the one or more photographs. In an exemplary embodiment, the one or more objects may be targets or subjects of the photographs. The one or more objects may include persons, faces of persons, buildings, animals, plants, or the like. In an exemplary embodiment, the first server 422 may determine information on the identified one or more objects. If persons or faces of persons are identified, the first server 422 may further identify other characteristics such as the number of persons present in the photograph, and the age and gender of each person.

In operation 515, the first server 422 may generate data on the received photographs, based on the identified object or the context information. For example, the first server 422 may generate the data on the photographs such as "number of faces (e.g., two), age and gender of persons (e.g., 27-year-old male or 28-year-old female), photographed position (e.g., coordinate of 37.561 and 127.04), and weather (e.g., sunny)" for each received photograph. Further, the first server 422 may use facial recognition technology to identify the persons whose faces were captured in the photographs.

In operation 517, the first server 422 may delete personal information which may be included in the generated data on the photographs. The personal information may include information for identifying a person included in the photographs. For example, the personal information may be the names of one or more persons included in the photographs, faces, identification information (e.g., a resident registration number, a portable phone number, etc.), or residence information. The first server 422 may delete the personal information to generate anonymized data.

In operation 519, the first server 422 may transmit, to an external device, the data on the photographs from which the personal information has been deleted, i.e. anonymized data. The external device may be the second server 424. In an exemplary embodiment, the anonymized data may be generated by determining data that is irrelevant to personal information.

Though not illustrated, in an exemplary embodiment, the first server 422 may convert position information of the photographs into POI information. For example, the first server 422 may convert position information expressed as latitude 37.242 and longitude 127.06 into the name of a specific point location such as 'Gyeongbokgung'.

Figure 5C:
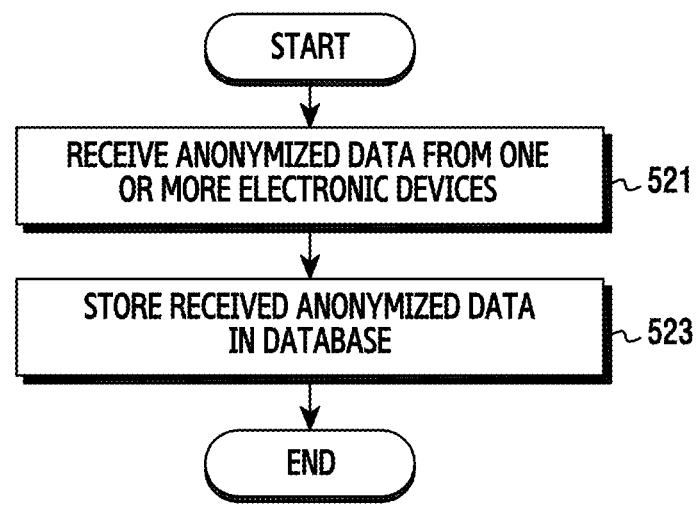
FIG. 5C is a flowchart illustrating a method of storing, by a server, anonymized data according to an exemplary embodiment of the present disclosure.

FIG. 5C is a flowchart illustrating a method of storing, by a server, anonymized data according to an exemplary embodiment of the present disclosure.

Below, to facilitate ease of description, the second server 424 or the server 420 are said to perform the operations of FIG. 5C. However, the present disclosure is not so limited.

Referring to FIG. 5C, in operation 521, the second server 424 may receive anonymized data from one or more electronic devices. The one or more electronic devices may be the first server 422. When the operation is carried out by the server 420, the one or more electronic devices may be the plurality of electronic devices 451 to 455. That is, unlike the first server 422, the second server 424 may only receive anonymized data and never process personal information that may identifier users or persons in the photographs.

In operation 523, the second server 424 may store the received anonymized data on the photographs in the database 434. Alternatively, if the server 420 performs this step, the server 420 may store the received anonymized data on the photographs in the database 430.

Though not illustrated, by convert position information in the received anonymized data into location information, the second server 424 may store a POI database in the database 434 as well.

Figure 5D:
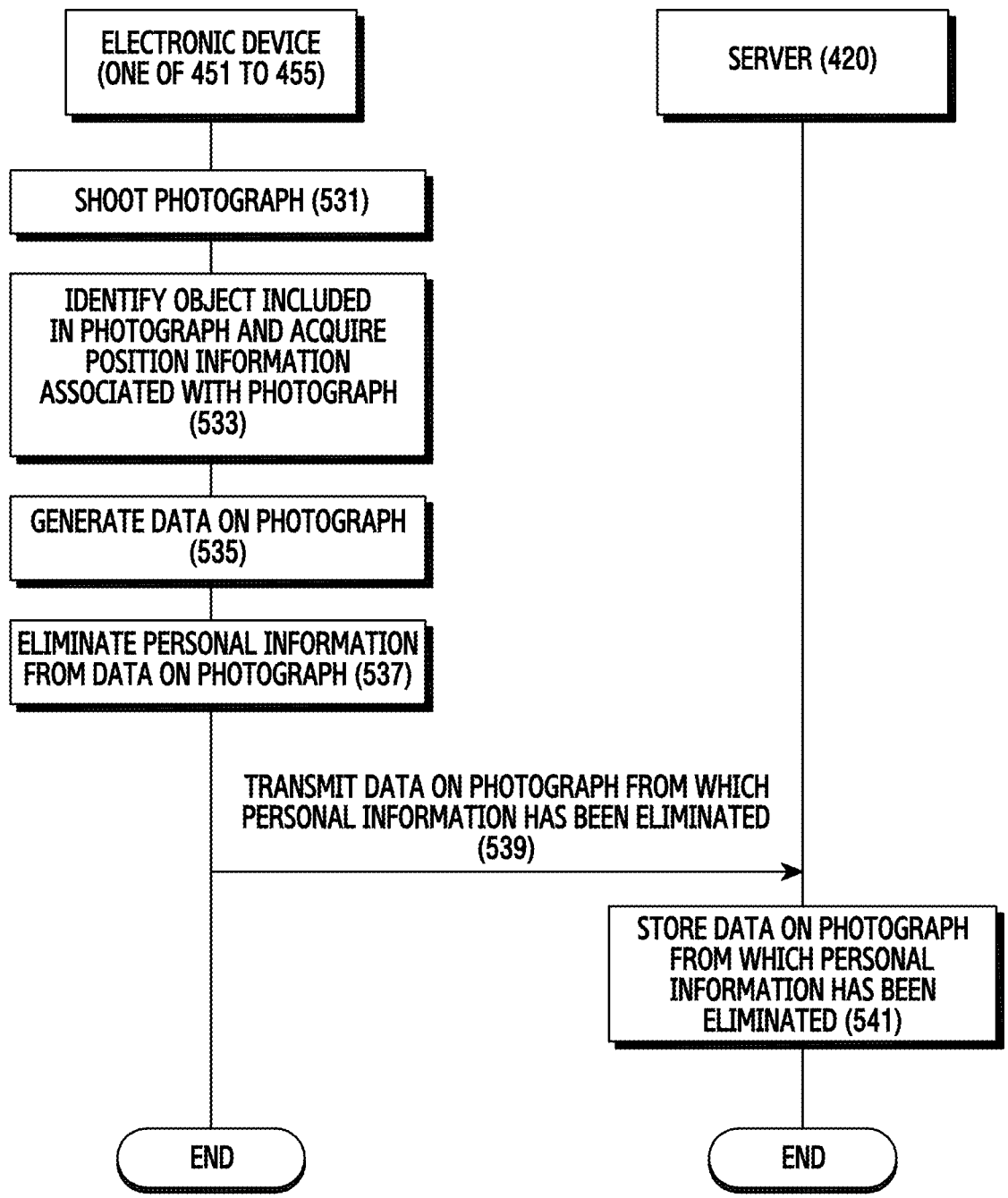
FIG. 5D is a flowchart illustrating transmission of a signal between an electronic device and a server and a method of storing, by a server, anonymized data according to an exemplary embodiment of the present disclosure.

FIG. 5D is a flowchart illustrating transmission of a signal between an electronic device and a server and a method of storing, by a server, anonymized data according to an exemplary embodiment of the present disclosure.

In FIG. 5D, the server may be the server 420. Below, to facilitate ease of description, one of the electronic devices 451-455 and the server 420 are said to perform the operations of FIG. 5D. However, the present disclosure is not so limited.

Referring to FIG. 5D, in operation 531, one of the electronic devices 451 to 455 may capture a photograph.

In operation 533, one of the electronic devices 451 to 455 may identify one or more objects from the photograph. For example, the one or more objects may include persons, faces of persons, buildings, animals, plants, or the like. In an exemplary embodiment, one of the electronic devices 451 to 455 may identify persons included in the photograph, and determine characteristics of the persons such as age and gender. One of the electronic devices 451 to 455 may further acquire position information associated with the photograph in step 533, by for example extracting the position information from the metadata of the photograph.

In operation 535, one of the electronic devices 451 to 455 may generate data on the photographs. For example, the information previously identified and acquired in step 533 may be stored in a generated data structure in step 535. Therefore, the data on the photographs may include position information of the photograph and information related to objects in the photograph.

In operation 537, one of the electronic devices 451 to 455 may delete personal information from the data on the photographs. Alternatively, one of the electronic devices 451 to 455 may acquire only data that is not personal information at step 533.

In operation 539, one of the electronic devices 451 to 455 may transmit, to the server 420, the anonymized data on the photographs.

In operation 541, the server 420 may store the received anonymized data on the photographs in the database 430.

Through the above operations, the server 420 may receive the anonymized data on the photographs, i.e. data that does not include personal information, from one of the electronic devices 451 to 455, and store the same.

The anonymized data on the photographs disclosed in FIG. 5B, FIG. 5C, and FIG. 5D may be exemplified in Table 1 below. The anonymized data on the photographs may be generated by eliminating the personal information from the data on the photograph as shown in FIG. 5B, or by receiving the data from which the personal information has already been eliminated as shown in FIGS. 5C and 5D.

TABLE 1

| Code | Persons | Time | GPS | Supplementary info |
| --- | --- | --- | --- | --- |
| 0332F32MO6F | Three persons, 32-year-old and 6-year-old females, and 32-year-old male | 2016.07.31, 11:00AM | 37.242, 127.06 | Weather_sunny |
| 0432M32F10F06F | Four persons, 32-year-old, 6-year-old and 8-year-old females, and 32-year-old male | 2016.07.31, 11:01AM | 37.242, 127.06 | Weather_sunny |
| 0123M | One person, 23-year-old male | 2016.07.28, 12:05AM | 37.322, 127.22 | Weather_rain |
| 0223M21F | Two persons, 23-year-old male, and 21-year-old female | | | |
| 0211F12F | Two persons, 12-year-old and 11-year-old females | | | |
| 0206M12F | Two persons, 6-year-old male and 12-year-old female | | | |

The anonymized data may be anonymized data generated by the first server 422, or anonymized data generated by the plurality of electronic devices 451 to 455 and transmitted to the server 420.

Referring to Table 1, the anonymized data may include information "person—three (32-year-old female, 6-year-old female, and 32-year-old male), time—Jul. 31, 2016, 11:00 AM, position—37.242, 127.06, and weather information—sunny," as shown in the second row of Table 1.

Figure 5E:
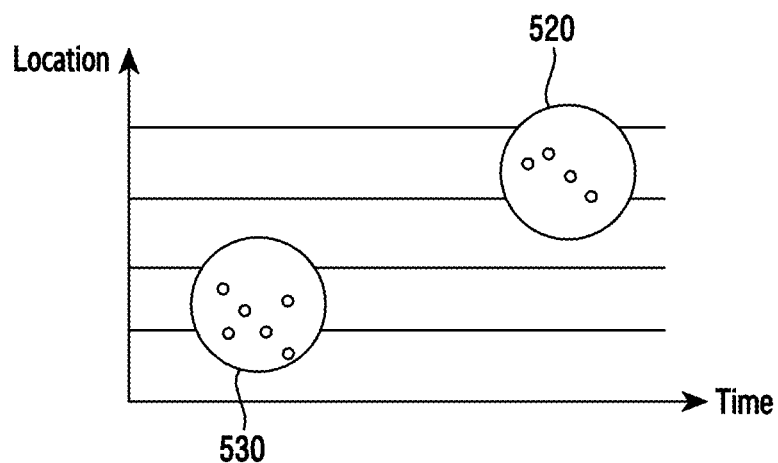
FIG. 5E is diagrams of anonymized data according to an exemplary embodiment of the present disclosure.
Figure 5E:
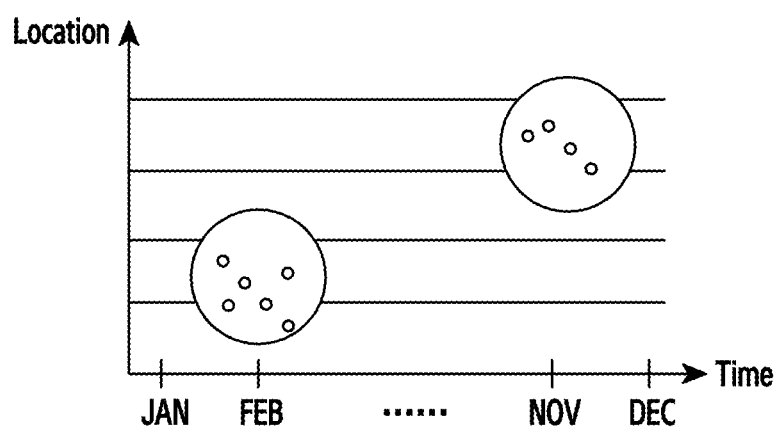

Also, the anonymized data may be classified with various criteria. For example, the anonymized data may be classified according to time and position. An example of the anonymized data classified according to time and position is given in FIG. 5E. FIG. 5E illustrates anonymized data plotted on a two-dimensional grid, where the X axis indicates time and the Y axis indicates position. In an exemplary embodiment, data 520 or 530 corresponds to anonymized data that are within a certain time range and a certain position range. For example, each anonymized data in the data 520 may be regarded as having visited the same location. The time axis may be non-repeating or repeating. For example, the second figure of FIG. 5E illustrates anonymized data in which the X axis indicates a repeating cycle of one year. A photograph shot on Jul. 13, 2013 and a photograph shot on Jul. 13, 2014, in the embodiment shown in FIG. 5E, may have the same X coordinate value.

As shown in Table 1, each row of the table may correspond to one photograph, and each photograph may be indexed by a unique identifier code. For example, the photograph corresponding to the first row is indexed with "0332F32M06F."

As shown in Table 1, the anonymized data may include one or more items, which may include a person's characteristics (e.g., gender, age, family relation, etc.), information on weather (e.g., temperature, humidity, whether it is raining or not, etc.), information on the position of the photograph, etc. The item of the anonymized data is not limited to the items shown in Table 1. Additional information extracted from the photograph, such as vehicle information, may constitute additional items in the anonymized data.

The various items of the anonymized data are further described below.

The items of the anonymized data may be classified into various subsets in accordance with importance. For example, position information (e.g., GPS in Table 1), time information (Time in Table 1) and person identification information (Persons in Table 1), which are relatively important items, may be classified into a first subset. Other items such as weather, anniversary, vehicle information, etc., which are relatively less important, may be classified into a second subset.

The position information (e.g., GPS in Table 1) may indicate the location at which the photograph was taken. In an exemplary embodiment, the first server 422 may determine the location where the photograph was taken based on the metadata of the photograph or by identifying an object of a known location (e.g. a landmark) in the photograph. In one exemplary embodiment, the server 420 may receive the location information of the photographs from the plurality of electronic devices 451 to 455. In another embodiment, the second server 424 may receive the same from the first server 422. The location information of the photographs may be expressed in terms of latitude and longitude, an address converted based on the latitude and longitude, or the name of a location corresponding to the latitude and longitude.

The time information (Time in Table 1) may indicate the time when the photograph was taken. In an exemplary embodiment, the time information may be determined based on the time zone associated with the location of the photograph.

The person identification information (Persons in Table 1) may be determined based on identification of persons in the photographs. In an exemplary embodiment, the person identification information may be determined based on the number of faces in a particular photograph, the sizes of the faces, the characteristics of the faces, etc. The person identification information may include the number of persons present in the photograph, ages, genders, and/or relation information of the persons, etc.

In an exemplary embodiment, the person identification information may include an identification of main persons in the photograph. The main person may be the primary subject in the photograph. The main person may be determined based on the number of faces in the photograph, the absolute or relative size of the faces, the characteristics of the faces, the ratio of the faces to their associated human bodies, the positions of the faces within the photograph, etc. For example, when the number of faces appearing on the photograph is five, two main persons may be identified when their faces are relatively larger than the other three faces.

In an exemplary embodiment, the relation information (not shown in Table 1) may be information on the relationships between the persons in the photograph. The relationships may be determined based on the number of persons in the photograph, ages, and/or genders of the persons, etc. For example, the persons may be identified as husband and wife, family member, parents and children, friends, etc.

In another exemplary embodiment, the relation information may be determined based on whether the number of persons, the distance between faces, the difference in gender, or the difference in age, etc. are smaller than predetermined values. For example, when one man and one woman appear on a photograph and the distance between their faces is within a predefined value, the two may be identified as a couple. For another example, when one man and one woman appear on a photograph and their age difference is within a predefined value, they may be identified as a couple. For further example, when faces of one men and one woman are located within a predefined distance, they may be identified as couple. For yet another example, when one man and one woman appear on a photograph and each of their ages is equal to or is more than a predefined age, they may be identified as husband and wife.

In another exemplary embodiment, by analyzing an object included within the photograph, vehicle information may be determined. For example, license plate information may be identified in the photograph, which in turn may be used to identify the make and model of the vehicle and/or the owner of the vehicle.

The first server 422 may not store the data on a received photograph. This depends on the contents of the photograph. For example, when the photograph only captures scenery and does not include any people, the first server 422 may discard the data on the photograph. For another example, even though a person is included in a received photograph, when the first server 422 cannot determine the position information of the photograph, the first server 422 may likewise discard the data on the photograph FIG. 6 is a flowchart illustrating a method of providing, by a server, recommended location data according to an exemplary embodiment of the present disclosure.

Figure 6:
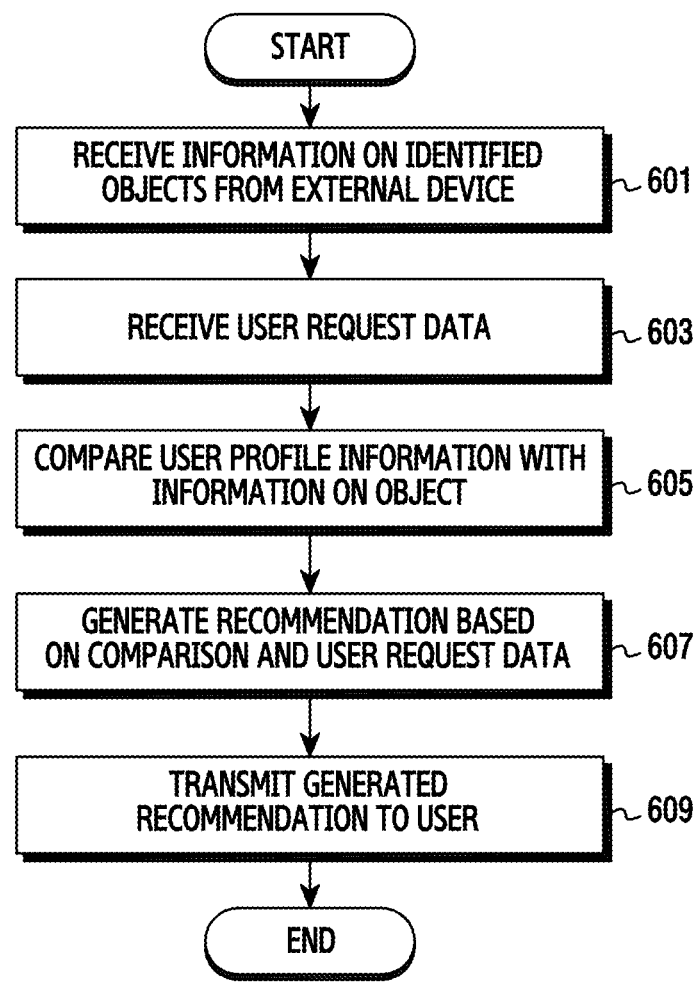
FIG. 6 is a flowchart illustrating a method of providing, by a server, recommended location data according to an exemplary embodiment of the present disclosure.

The server of FIG. 6 may be the second server 424 or the server 420. Below, to facilitate ease of description, the second server 424 is said to perform the operations of FIG. 6. However, the present disclosure is not so limited.

Referring to FIG. 6, in operation 601, the second server 424 may receive information on identified objects from an external device. The external device may be the first server 422. The information on the identified objects may include a plurality of anonymized data. In operation 603, the second server 424 may receive user request data from the electronic device 400. The user request data indicates one or more criteria for recommended location data. As explained above, the criteria may be related to the characteristics of the user of the electronic device 400 or related to the context of the electronic device 400. For example, the user request data may indicate criteria such as "restaurants popular with 20-somethings within 100 feet of location X."

The user request data to be transmitted to the second server 424 may be data that the electronic device 400 generates at least partially based on the user's profile information. The user request data may be transmitted in response to a request for location recommendation submitted by the user to the electronic device 400. Alternatively, even when the electronic device 400 does not receive the request on location recommendation from the user, the user request data may be automatically generated according to a predetermined setting value. For example, when a specific application is activated for a specified time interval or more, or when in the electronic device 400 is within a specified distance to a specific position, or when in the electronic device 400 reaches at a specific time, the user request data may be automatically generated. The user request data may include information on one or more characteristics of the user, information on weather, information on a location of the user or the electronic device 400, information on a search range, etc.

In operation 605, the second server 424 may compare profile information of the user who has transmitted the user request data with the information on the identified objects. For example, the second server 424 may extract data from the anonymized data that matches the user's profile information. The second server 424 may first determine items that are common to the plurality of anonymized data and the user's profile information. For example, both the anonymized data and the user's profile information may list ages and genders of persons. By comparing values of the determined common items to determine the similarities in the respective data, the second server 424 may extract the data from the anonymized data that matches the user's profile information. In an exemplary embodiment, similarity may be determined when the values in the anonymized data and in the user's profile information are within a preset range.

In an exemplary embodiment, items that are not common among the user's profile information and the plurality of anonymized data may be excluded in determining the similarity.

The second server 424 may assign various weights to the items in accordance with the importance of the items. The importance of the items may be determined according to whether it is an item that is relevant to a user's determination to visit a particular location. For example, assume the user request data is for a restaurant. The second server 424 may assign relatively high weights to genders, ages, relation information, etc., which are factors that are relatively important in selection of a restaurant. The second server 424 may assign relative low weights to factors that are not relatively important. For example, the second server 424 may assign a relatively high weight to "existence or non-existence of child," but may assign a relatively low weight to "number of children." In this example, the user may primarily select a restaurant depending on whether it is child-friendly or not. The existence or non-existence of children in the anonymized data may help to indicate whether the restaurant is child friendly. Therefore it is given a high weight. However, the number of children does not indicate whether the restaurant is child friendly, and therefore a lower weight may be given.

The second server 424 may determine similarity when the values in the anonymized data and in the user's profile information are within a preset range. For example, when the age of the user's profile information is "23-year-old," the second server 424 may assign a relatively high weight to data corresponding to 21-year-olds, compared to data corresponding to 29-year-olds among the anonymized data.

In another exemplary embodiment, the second server 424 may determine the similarity depending on the value of the common item. For example, when a part of the user request data is "Sunday," the second server 424 may assign a relatively high weight to data corresponding to "Saturday" compared to data corresponding to "Monday" among the plurality of anonymized data. That is because although Saturday and Sunday are different days, they might share similar characteristics because they are both weekend days.

In yet another exemplary embodiment, the second server 424 may determine the similarity in consideration of all common items in the user's profile information and the plurality of anonymized data, or only some common items thereof. When all common items are considered, when similarity is not found, the second server 424 may again determine the similarity in consideration of only some common items. For example, the second server 424 may determine the similarity in consideration of only relation information (e.g. family relationships), among other common items such as the number of companions, the time at which the photographs are taken, etc.

The second server 424 may find items in the anonymized data to be similar to the corresponding items in the user's profile information when they are within a specified range of each other. For example, when the age of the user in the user's profile is determined to be "age—24," the second server 424 may set a specified range of "age—19 to 29," i.e. plus or minus 5 of the user's age. The second server 424 may then determine anonymized data corresponding to the constant range as the data matching the user's profile information.

In operation 607, the second server 424 may generate recommendation based on the comparison and the user request data. In an exemplary embodiment, the second server 424 may determine, as recommendation information, data corresponding to the user request data (e.g., a search range, a business type, etc.) among the anonymized data matched with the user's profile information. For example, assume that a user's profile is determined as "age—24-year-old female, companion—23-year-old male, and relation information—couple," and a user has made a request for "restaurants near the Gangnam station in Seoul." The second server 424 may compare the user's profile information and the plurality of anonymized data to extract data corresponding to "20-something couples." Within this subset of data, the second server 424 may then find restaurants within a certain distance to Gangnam station in Seoul by using other items in the anonymized data such as position information of the photographs and review of restaurants. In an exemplary embodiment, the second server 424 may only return restaurants that have been visited over a predetermined number of times or is associated with at least a predetermined number of photographs. For example, the second server 424 may only return restaurants that are captured in at least five photographs from the electronic devices 451-455.

In operation 609, the second server 424 may transmit the generated recommendation to the electronic device 400. In other words, the second server 424 may transmit information on one or more locations from the anonymized data that matched with the user's profile information and the user's request. Here, the information on the location may be in various forms such as addresses, position values (e.g., GPS values), names, etc.

Figure 7A:
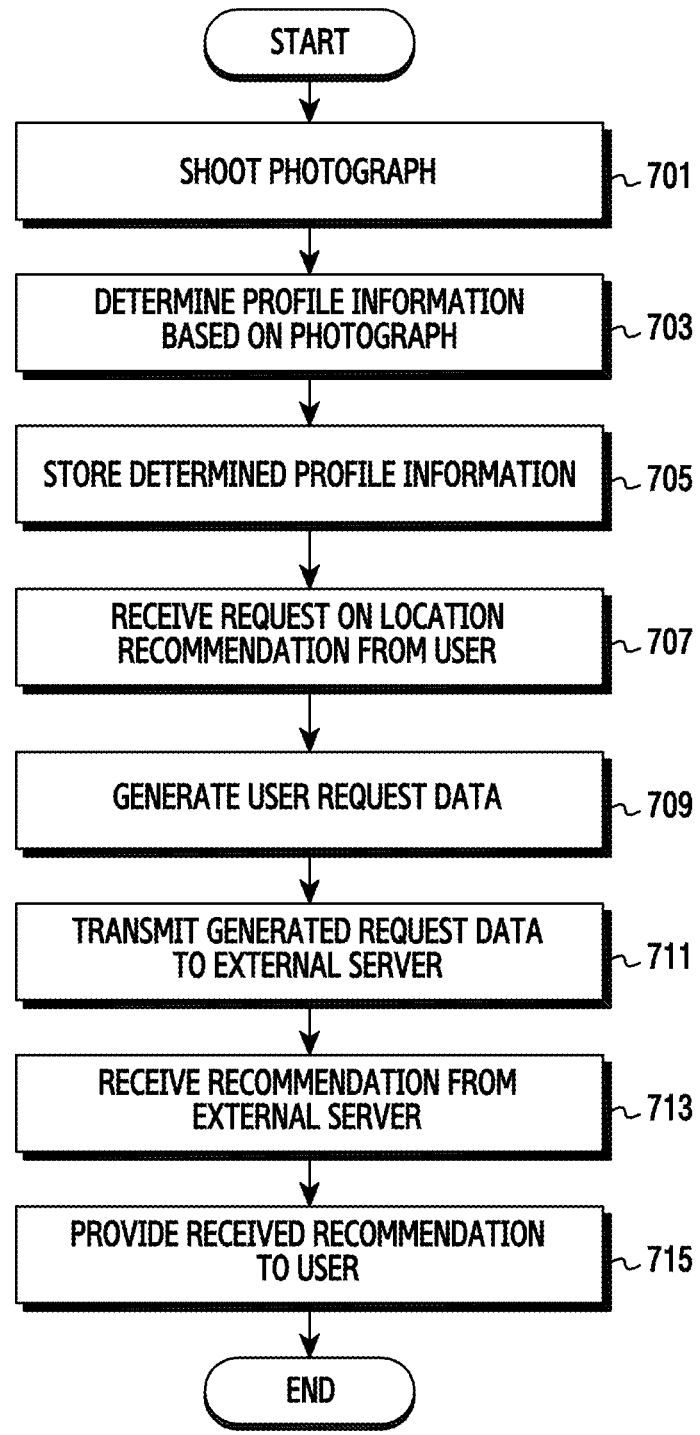
FIG. 7A and FIG. 7B are flowcharts illustrating methods of receiving, by an electronic device, recommended location data according to exemplary embodiments of the present disclosure.

FIG. 7A is a flowchart illustrating a method of receiving, by an electronic device, recommended location data according to an exemplary embodiment of the present disclosure.

For ease of explanation, the below description uses the electronic device 400 to perform the operations of FIG. 7A in conjunction with the server 420 or second server 424. However, the present disclosure is not so limited.

Referring to FIG. 7A, in operation 701, the electronic device 400 may capture a photograph. In an exemplary embodiment, the electronic device 400 may control the camera module 291 to shoot the photograph in response to a user's input, or in response to meeting a preset condition (e.g., expiration of a timer).

In operation 703, the electronic device 400 may determine user's profile information based on the photograph. In an exemplary embodiment, the electronic device 400 may determine the user's profile information based on information on objects in the photograph and/or information on contexts related with the photograph.

In operation 705, the electronic device 400 may store the determined profile information. In an exemplary embodiment, the electronic device 400 may store the determined profile information in the memory 130.

The electronic device 400 may receive a request on location recommendation from a user. In an exemplary embodiment, the electronic device 400 may receive the request from the user as a text input or a voice command.

In an operation 709, the electronic device 400 may generate user request data. In an exemplary embodiment, the user request data may be determined based on the determined profile information or the request on location recommendation received from the user. For example, the electronic device 400 may generate the user request data as "person—a couple in their 30's, time—11 o'clock to 13 o'clock, and business type—restaurant".

In operation 711, the electronic device 400 may transmit the generated user request data to an external server. In an exemplary embodiment, the external server may be the server 420 or the second server 424.

In operation 713, the electronic device 400 may receive recommendations from the external server. In an exemplary embodiment, the recommendations may be information on one or more locations corresponding to the user request data, transmitted from the external server.

In operation 715, the electronic device 400 may provide the user with the recommendations received from the external server. In an exemplary embodiment, the electronic device 400 may provide the recommendation information to the user visually through a display or aurally through a speaker.

Figure 7B:
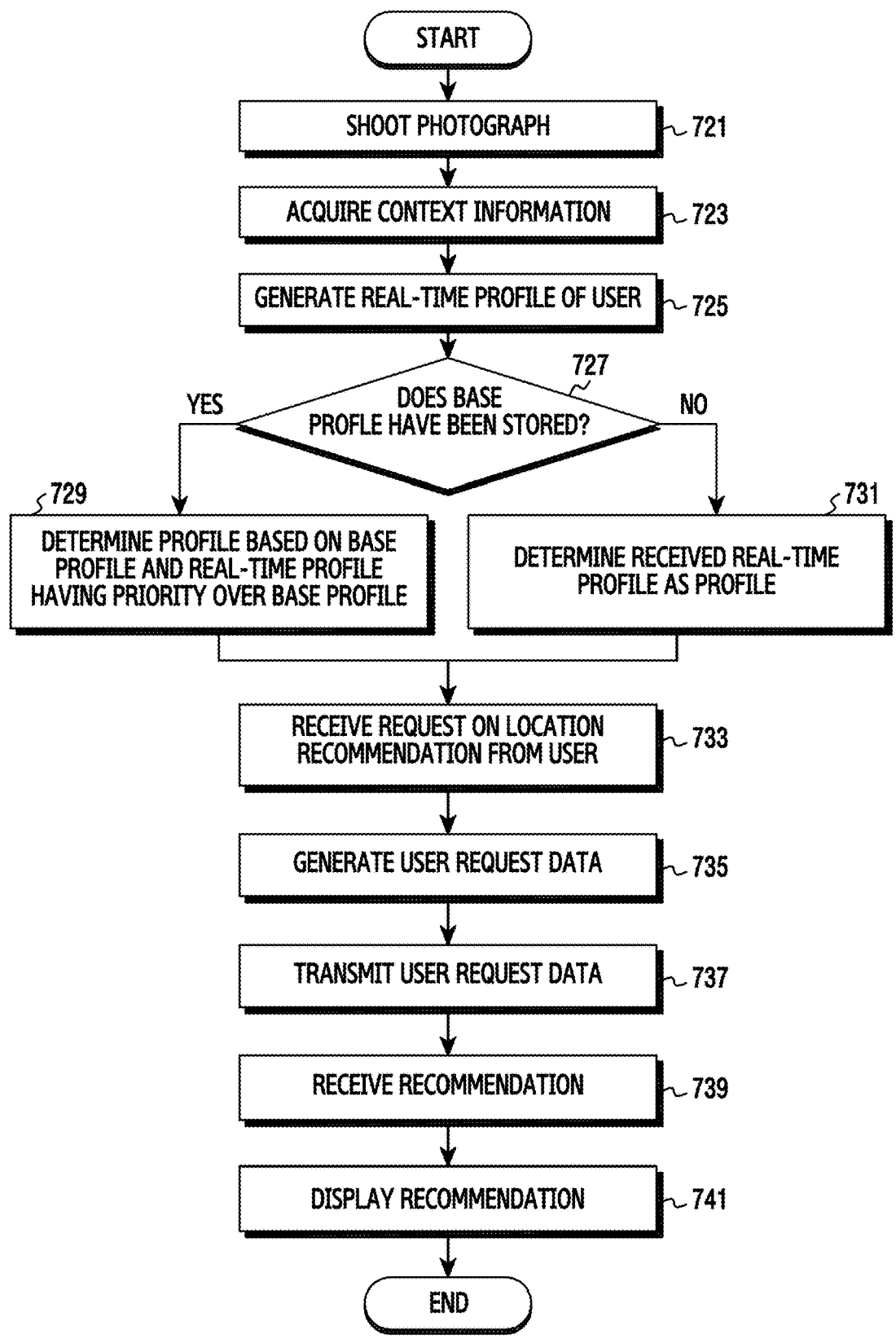

FIG. 7B is a flowchart illustrating a method of receiving, by an electronic device, recommended location data according to an exemplary embodiment of the present disclosure.

For ease of explanation, the below description uses the electronic device 400 to perform the operations of FIG. 7B in conjunction with the server 420 or second server 424. However, the present disclosure is not so limited Referring to FIG. 7B, in operation 721, the electronic device 400 may capture a photograph. In an exemplary embodiment, the electronic device 400 may control the camera module 291 to shoot the photograph in response to a user's input, or in response to meeting a preset condition (e.g., expiration of a timer).

In operation 723, the electronic device 400 may acquire context information. The context information may be information regarding the surrounding or the environment of the electronic device 400 when the photograph was taken. For example, the context information may be an identification of an application that is executed in the electronic device 400 when the photograph was taken, data collected by a sensor (e.g., temperature-humidity sensor 240J) of the electronic device 400 when the photograph was taken, etc.

In operation 725, the electronic device 400 may generate real-time profile information of the user of the electronic device 400. In an exemplary embodiment, the real-time profile information may be information indicating a user state or context when the photograph was taken. For example, the electronic device 400 may generate the real-time profile information based on objects in the photograph that was taken and the context related to the photograph. The real-time profile information may include one or more items such as the user's characteristics (e.g., age, gender, relation information, etc.), information on weather, information on a position, etc. For example, the real-time profile information of the user may include information such as "user—20-year-old man, companion—24-year-old woman, and weather—rain."

Relation information may be information on the relationships between various persons which has been determined based on the number of persons, the ages, the genders, etc. For example, relation information may indicate that two people are husband and wife, family relatives, friends, etc. In an exemplary embodiment, the electronic device 400 may determine the user's relation information with respect to another person who appears on the photograph captured in step 721. For example, assume the user, and persons B and C appear in the photograph, and the user and person B are known to be husband and wife. If person C's age is determined to be lower than the age of the user and/or person B by a predetermined threshold, then person C may be determined to be a child of the user and the person B.

In an exemplary embodiment, the electronic device 400 may output the generated user's real-time profile information so that the user can confirm the information. For example, when the user's real-time profile generated by the electronic device 400 is "user—36-year-old female, companion—35-year-old male, 4-year-old female, 3-year-old female, and weather—rain," the electronic device 400 may display a confirmation message such as "I guessed you are now with your family (husband and two children). Is that right?"

In operation 727, the electronic device 400 may check whether base profile information of the user is stored in a storage device (e.g., memory 130) of the electronic device 400. In an exemplary embodiment, the base profile information may include information about the user, such as the user's age, that is common to a plurality of photographs captured by the electronic device 400.

In an exemplary embodiment, the base profile information may be based on photographs the user has previously shot.

When there is base profile information in memory, in operation 729, the electronic device 400 may determine a user's profile based on at least one of the stored base profile information and the generated real-time profile information. In an exemplary embodiment, the real-time profile information may have higher priority than the base profile information. For example, in case where the base profile information has been stored as "user—35-year-old male, companion—36-year-old female, 5-year-old male, 4-year-old female, and relation information—family," and the real-time profile information has been generated as "user—35-year-old male, companion—35-year-old male, and relation information—friend," the real-time profile may have priority over the base profile and accordingly, the user's profile may be determined as the "user—35-year-old male, companion—35-year-old male, and relation information—friend." When the base profile information and the real-time profile information do not conflict with each other, the electronic device 400 may determine user's profile information in consideration of both profile information. For example, in case where the base profile information has been stored as "user—35-year-old male, companion—36-year-old female, 5-year-old male, 4-year-old female, and relation information—family," and the real-time profile information has been generated as "user—35-year-old male and weather information—rain," the electronic device 400 may determine the user's profile information as "user—35-year-old male, companion—36-year-old female, 5-year-old male, 4-year-old female, relation information—family, and weather information—rain."

When the base profile has not been stored, in operation 731, the electronic device 400 may determine the user's real-time profile information as the user's profile information. That is, the electronic device 400 may determine the user's profile based on the real-time profile, without the base profile.

Figure 7C:
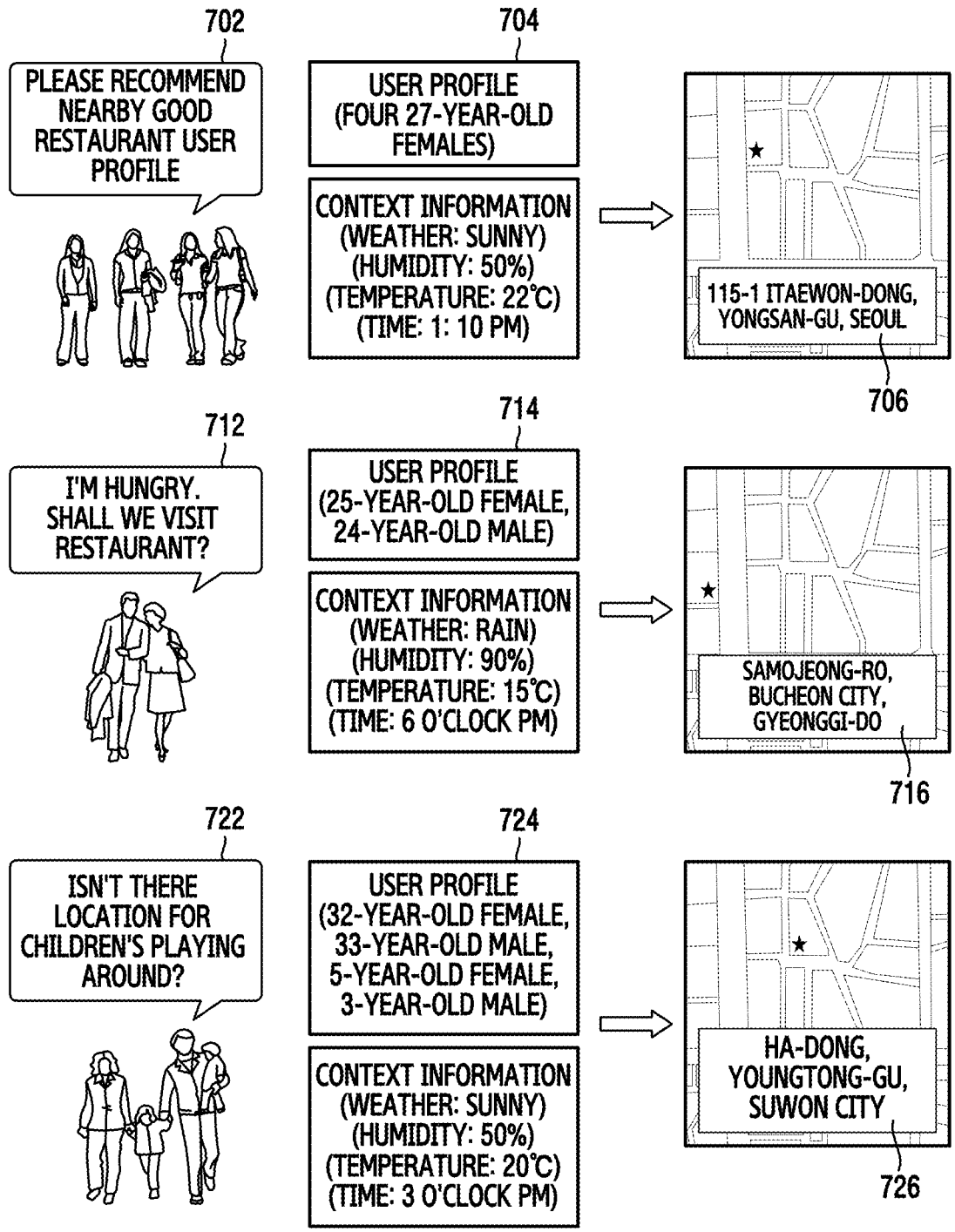
FIG. 7C is diagrams of recommended locations provided with a criterion of a user's profile and context information according to an exemplary embodiment of the present disclosure.

In operation 733, the electronic device 400 may receive a request on location recommendation from the user. In an exemplary embodiment, the request on location recommendation may be inputted by the user as a text input or voice command. The electronic device 400 may receive the request from the user, and determine if the received request is a question about a position. However, even when the received question is not explicitly a question about position, the electronic device 400 may determine if the received question is indirectly related with position. For example, when the user clicks a link related to a specific location in a website, or clicks an icon for searching locations in a map interface, the electronic device 400 may determine that it has received a question related to a location from the user. For example, as shown in FIG. 7C, the electronic device 400 may receive a request on location recommendation via voice command, such as "Please recommend a nearby good restaurant" (702), "I'm hungry. Shall we visit a restaurant?" (712), or "Isn't there a location for children's playing around?" (722). The electronic device 400 then may determine that it has received the request on location recommendation.

But even when the user does not explicitly and/or directly make a request on location recommendation, the electronic device 400 may indirectly determine a request on location recommendation by analyzing user input in context. For example, the electronic device 400 may scan a text or voice conversation the user has with a companion. When the user or the companion says "I'm hungry. Shall we visit a restaurant?" the electronic device 400 may determine that a request on location recommendation has been made. Alternatively, the electronic device 400 may detect that the user is talking to himself or herself and says "Isn't there a location for children's playing around?" The electronic device 400 may also interpret that as a request for location recommendation.

In an exemplary embodiment, the electronic device 400 may determine whether it has received the request on location recommendation based on whether a predefined specific keyword is inputted. The specific keyword may be "recommendation," "dinner," "tourist attraction," "restaurant," etc., and may also be location names. The keyword may be inputted via an input window displaying in the browser 375.

In another exemplary embodiment, the electronic device 400 may receive a request for location recommendation through a messenger application such as Chatbot, etc., or messenger applications provided by SNS services such as Twitter, Facebook, etc. For example, the electronic device 400 may receive the request by scanning whether a relevant keyword is entered in a text message conversation in the messenger application.

The request on recommended location is not limited to the current position of a user, and is not limited to one position. For example, the request may be a question about a route between two or more positions.

If the electronic device receives the request on location recommendation from the user, in operation 735, the electronic device 400 may generate user request data to be transmitted to the server 420 based on the received request and/or the determined user's profile. The user request data includes one or more variables and values that are used by the server 420 to generate recommended location data. In an exemplary embodiment, the user request data may include one or more items, and the one or more items may be information on characteristic of persons, information on weather, information on a location, information on a search range, etc. For example, in case where the received request is "Please let me know a location serving a lunch around here," and the determined user's profile is "user—30-year-old male, companion—32-year-old female, relation information—couple, and weather—rain", the electronic device 400 may generate user request data as "person—a couple in their 30's, time—lunch or 11 o'clock to 13 o'clock, search range—within a distance of 200 m of current location, and business type—restaurant." Other examples are shown in FIG. 7C. Referring to FIG. 7C, the electronic device 400 may determine user request data 704 as "persons—four 27-year-old females, weather—sunny, time—13:10, temperature—22 degrees, and humidity—50%," user request data 714 as "persons—25-year-old female and 24-year-old male, weather—rain, time—18:00, temperature—15 degrees, and humidity—90%," user request data 724 as "persons—32-year-old female, 33-year-old male, 5-year-old female, and 3-year-old male, weather—sunny, time—15:00, temperature—20 degrees, and humidity—50%," etc.

The electronic device 400 may narrow the business types specified in the user request data depending on the request from the user. The business type or category may be a restaurant, a hospital, a parking lot, convenient facilities, sports facilities, lodging facilities, a bank, a gas station, a convenience stall, a mart, traffic facilities, etc. For example, when keywords "location to sleep" are included in a request from the user, the electronic device 400 may limit the business type of user request data to hotels or lodging facilities. As another example, when the keyword "tourist attraction" are included in the request received from the user, the electronic device 400 may exclude business types such as hospitals, lodging facilities, banks, parking lots, etc., and include all other business types.

In an exemplary embodiment, even when the user does not input a request on location recommendation, the electronic device 400 may generate user request data after a predetermined trigger event. The trigger event for generation of the user request data may be determined in advance. For example, the trigger event may be when the current time is within a certain range of a specific time (e.g., meal time), when the current position of the electronic device 400 is approaching within a certain range of a specific position, activation of a specific application for a specified time interval, etc.

The trigger event may include one or more conditions. For example, the trigger event be when the current time is approaching within a certain range at a specific time (e.g., 18:00 PM), and being stuck in traffic.

In operation 737, the electronic device 400 may transmit the generated user request data to the server 420 so that the server 420 may generate recommended location data based on the user request data. The server 420 may compare the profile information of the user who has transmitted the user request data with various information in the anonymized data stored in the database 430, and generate the recommended location data based on the comparison result.

For example, the server 420 may determine various recommended locations depending on the context of the user. For example, when the user's profile is a family of four persons including two children, and weather context information is raining, the recommended location may be an indoor facility for families. But if the weather context is sunny, the recommended locations may be outdoor facilities (e.g., parks) for families.

In operation 739, the electronic device 400 may receive the recommended location data generated in the server 420. The information on the locations may be defined in various forms such as addresses, position values (e.g., GPS data), names of the locations, etc.

In operation 741, the electronic device 400 may display the received recommended location data on a screen, thereby providing the received recommended location data to the user.

In an exemplary embodiment, the electronic device 400 may provide the recommended location data to the user on its display. Here, the electronic device 400 may display a map image and/or a thumbnail image. For example, as shown in FIG. 7C, the electronic device 400 may display the recommended location data in maps as address information 706, 716 or 726.

In an exemplary embodiment, the electronic device 400 may additionally provide the user with other information (e.g., photograph information, comment information, post information, Blog information, review information, detailed description information of a location, etc.), etc. related to the recommended location data received from the server 420. For example, when the user requests tourist attractions and the recommended location data includes Gyeongbokgung and Changdeokgung palaces in Seoul, the electronic device 400 may further display information on Gyeongbokgung and Changdeokgung such as reviews of Gyeongbokgung and Changdeokgung.

In an exemplary embodiment, the electronic device 400 may determine the basis on which recommended location data has been determined. For example, the electronic device 400 may provide information that the recommended location data (e.g., Gyeongbokgung and Changdeokgung) provided to the user has been determined based on the user's profile and/or the user's request. As another example, the electronic device 400 may additionally provide the number of data points in the anonymized data (e.g., the number of photographs) used for determining the recommended location data, a rate of the occupied recommendation location data to the whole data which is determined based on the user's profile and/or the user's request, etc. For example, if the whole data is consist of location A (eighty cases) and location B (twenty cases), the electronic device 400 may additionally provide the recommendation location data (i.e., location A) occupies 80 percent in the whole data.

The electronic device 400 may further display the bases for the recommended location data, in addition to displaying the recommended location data. For example, when the recommended location data is a playground, which was determined based on a characteristic of the companion of the user (e.g., 6-year-old male), the electronic device 400 may display that the playground is recommended because of the age of the companion.

In an exemplary embodiment, the electronic device 400 may display the whole or only part of the recommended location data received from the server 420. When displaying part of the recommended location data, the electronic device 400 may take into account known preferences and tastes of the user. The electronic device 400 may determine the user's preferences by analyzing photographs that the user has taken. Alternatively, the user may enter his or her preferences as inputs. For example, from various photographs taken by the user, the electronic device 400 may determine that the user mainly goes to Korean restaurants. Accordingly, after receiving recommended location data related to a restaurant request, the electronic device 400 may filter out and only display Korean restaurants.

Figure 7D:
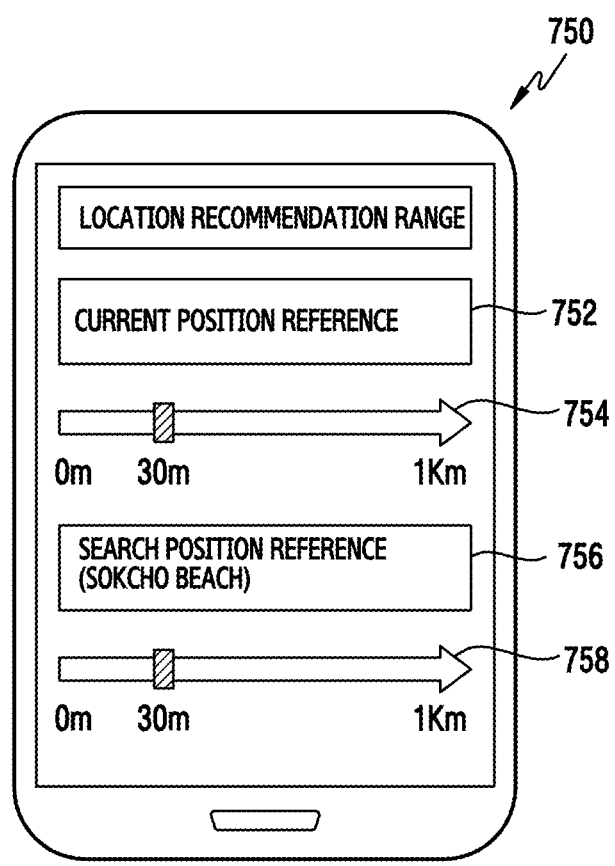
FIG. 7D is a diagram of an interface for setting a data search range according to an exemplary embodiment of the present disclosure.

In another exemplary embodiment, the electronic device 400 may display the whole or only part of the recommended location data in accordance with a user input. The user input may be entered in a user interface provided by the electronic device 400, where the user, for example, may set the range for location recommendation. An example of the interface is shown in FIG. 7D. Referring to FIG. 7D, a screen 750 may include interface constituent elements 754 and 758 for selecting range values, and interface constituent elements 752 and 756 labelling elements 754 and 758. The electronic device 400 may only display location data that fall within the ranges specified by elements 754 and 758. As illustrated in FIG. 7D, the user may select ranges with respect to the current position of the electronic device and with respect to a search reference position. The search reference position may be selected by the user. For example in FIG. 7D, the search reference position is selected by the user as "Sokcho beach."

Alternatively, the electronic device 400 may determine the search reference position based on the request on location recommendation received from the user. For example, when the electronic device 400 has received a request such as "Please recommend a restaurant near the Sokcho beach" from the user, the electronic device 400 may confirm that the location name "Sokcho beach" is included in the received request, and set the search reference position as the Sokcho beach.

In another exemplary embodiment, when the user does not input the search reference position, the electronic device 400 may set a predefined specific position (e.g., a home address, a company address or an earlier selected position) as the search reference position.

In an exemplary embodiment, the upper and lower limits of interface constituent elements 754 and 758 may be dynamically set by the electronic device 400. For example, the electronic device 400 may set the limits based on characteristics of the search reference position (e.g., whether it is a city or a countryside) and/or the user's profile. For example, when the search reference position is a position within a busy city, the electronic device 400 may set the upper limit value as a relatively small value. On the other hand, if the user's profile includes vehicle information, indicating that the user owns a vehicle has been determined, the electronic device 400 may set the upper limit value as a relatively large value.

Figure 8:
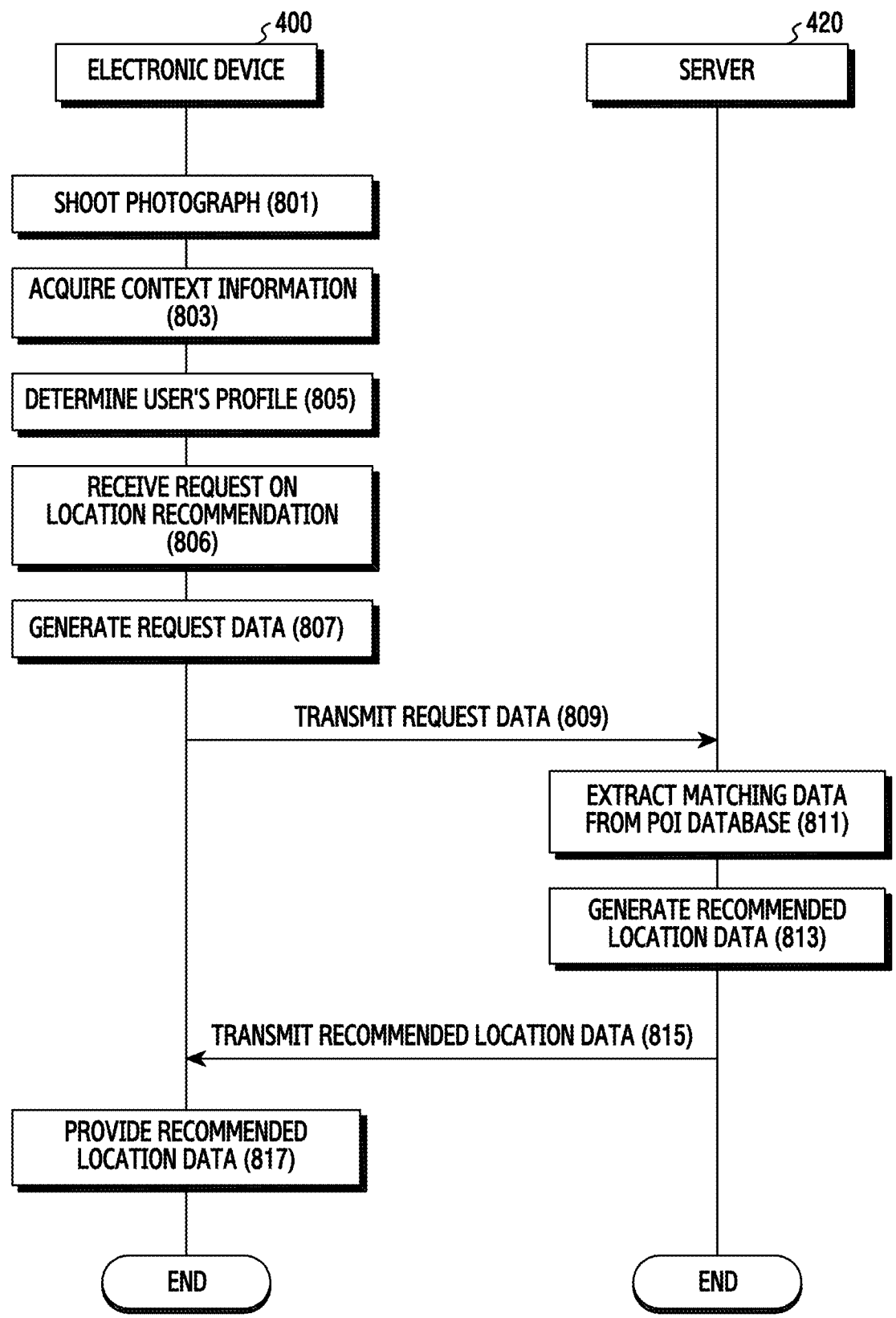
FIG. 8 is a flowchart illustrating transmission of a signal between an electronic device and a server and a method of providing location information according to an exemplary embodiment of the present disclosure.

FIG. 8 is a flowchart illustrating transmission of a signal between an electronic device and a server and a method of providing location information according to an exemplary embodiment of the present disclosure.

For ease of explanation, the below description uses the electronic device 400 to perform the operations of FIG. 8 in conjunction with the server 420. However, the present disclosure is not so limited.

Referring to FIG. 8, in operation 801, the electronic device 400 may capture or shoot a photograph. In an exemplary embodiment, the electronic device 400 may control the camera module 291 to shoot the photograph in response to a user's input, or in response to meeting a preset condition (e.g., expiration of a timer).

In operation 803, the electronic device 400 may acquire context information. The context information may be information regarding the surrounding or the environment of the electronic device 400 when the photograph was taken. For example, the context information may be weather information an activated widget of the electronic device 400 provides when the photograph was taken.

In operation 805, the electronic device 400 may generate user's profile information. In an exemplary embodiment, the electronic device 400 may determine the user's profile information based on the user's real-time profile information and/or the base profile information. Though not illustrated, the electronic device 400 may transmit the generated profile information to the server 420 as well. The real-time profile information may be information indicating a user state or context when the photograph was taken. The base profile information may be information on the user's characteristic that is obtained based on photographs the user has previously shot.

In operation 806, the electronic device 400 may receive a request on location recommendation from the user. In an exemplary embodiment, the electronic device 400 may receive the request from the user as a text input or a voice command. For example, the request on location recommendation may be a voice command such as "Please recommend a nearby good restaurant."

In operation 807, the electronic device 400 may generate user request data to be transmitted to the server 420. The user request data includes one or more variables and values that are used by the server 420 to generate recommended location data. In an exemplary embodiment, the electronic device 400 may generate the user request data based on the user's profile determined in operation 805 and/or the request on location recommendation received from the user in operation 806. In an exemplary embodiment, the user request data may include one or more items, and the one or more items may be information on characteristics of persons, information on weather, information on a location, information on a search range, etc. And, in operation 809, the electronic device 400 may transmit the generated user request data to the server 420.

In operation 811, the server 420 may extract data from the anonymized data that matches the profile information of the user who has transmitted the user request data. In an exemplary embodiment, the server 420 may determine items that are common to the anonymized data and the user's profile information. For example, both the anonymized data and the user's profile information may list ages and genders of persons. The server 420 then may compare the values of the common items to determine how similar each piece of anonymized data is to the user's profile information. Similar pieces of anonymized data are extracted. In performing the matching, the server 420 may determine that the values are similar if they are within a certain range of each other.

In operation 813, the server 420 may generate recommended location data. In an exemplary embodiment, the server 420 may generate the recommended location data, based on the extracted data that matched the user's profile information. In an exemplary embodiment, the server 420 may generate, as the recommended location data, data corresponding to a predetermined or designated rate among the extracted data, for example restaurants that are present in 20% of the anonymized data. In operation 815, the server 420 may transmit the generated recommended location data to the electronic device 400. In operation 817, the electronic device 400 may provide the received recommended location data to the user.

Figure 9:
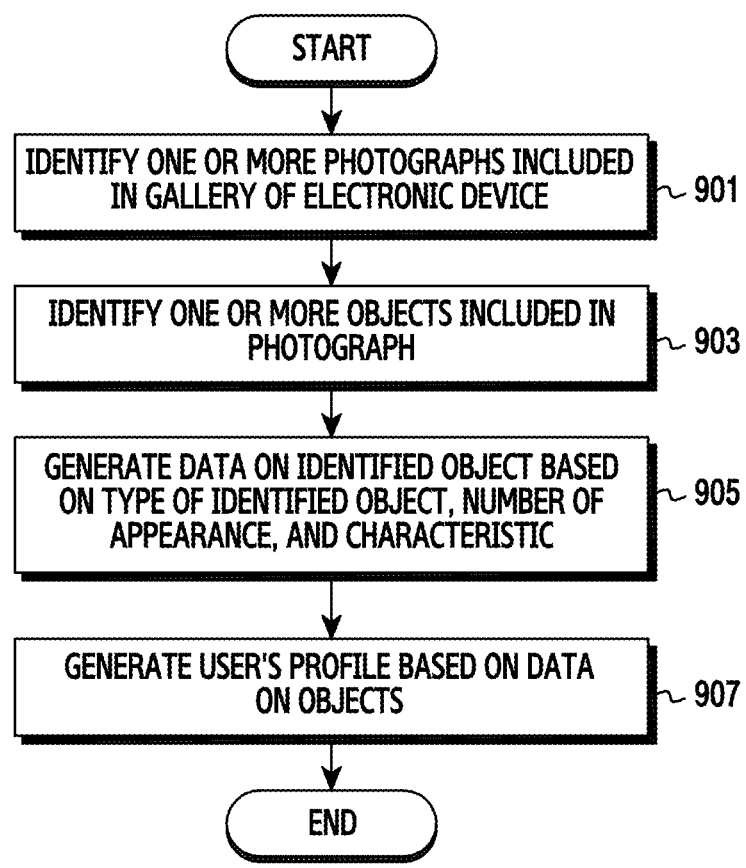
FIG. 9 is a flowchart illustrating a method of generating, by an electronic device, base profile information of a user according to an exemplary embodiment of the present disclosure.

FIG. 9 is a flowchart illustrating a method of generating, by an electronic device, base profile information of a user according to an exemplary embodiment of the present disclosure.

For ease of explanation, the below description uses the electronic device 400 to perform the operations of FIG. 9. However, the present disclosure is not so limited. Referring to FIG. 9, in operation 901, the electronic device 400 may identify one or more photographs the user has previously captured and stored in memory.

In operation 903, the electronic device 400 may identify one or more objects included in the photographs. In an exemplary embodiment, the one or more objects may be persons.

In operation 905, the electronic device 400 may generate data on the identified objects based on the type of the identified object, the number of appearance in the photographs by the object, the characteristics of the object, etc. For example, the electronic device 400 may determine the face of the person who most often appears as the face of the user. For another example, when an object (e.g., 5-year-old male) appears at a preset count or more in the photograph, the object may be determined to be the user's child.

In operation 907, the electronic device 400 may generate base profile information of the user based on the generated data on the objects. In an exemplary embodiment, the base profile information may include one or more items. The one or more items included in the base profile information may be age, gender, family relation information (e.g., information on the existence or non-existence of a child), etc. of the user. The electronic device 400 may determine the age and gender of the user based various factors such as the shape of eyes, hairstyle, whether the user's face has makeup on, wrinkles detected on the face, etc. The one or more items included in the base profile information generally are less transient than information included in the user's real-time profile. For example, the base profile information may include age, whereas real-time profile information may include the current location of the user. An exemplary base profile information may be "age—26, gender—male, in a relationship, no child, no car."

In an exemplary embodiment, the electronic device 400 may request user input in order to generate base profile information.

Though not illustrated, the electronic device 400 may store the generated base profile information in a memory. In an exemplary embodiment, the electronic device 400 may store associate a time stamp with the base profile information in the memory.

Though not illustrated, in an exemplary embodiment, the base profile information may be updated at predetermined intervals. For example, the base profile information may be updated every 3 months. Alternatively, the base profile information may be updated when an additional predetermined number of photographs are stored. For example, the base profile information may be updated with every 100 new photographs.

Though not illustrated, the electronic device 400 may request confirmation of the base profile information from the user by displaying a confirmation screen on its display.

The electronic device 400 may generate the base profile information at the request of the user, or automatically in accordance with a predetermined setting value.

Figure 10A:
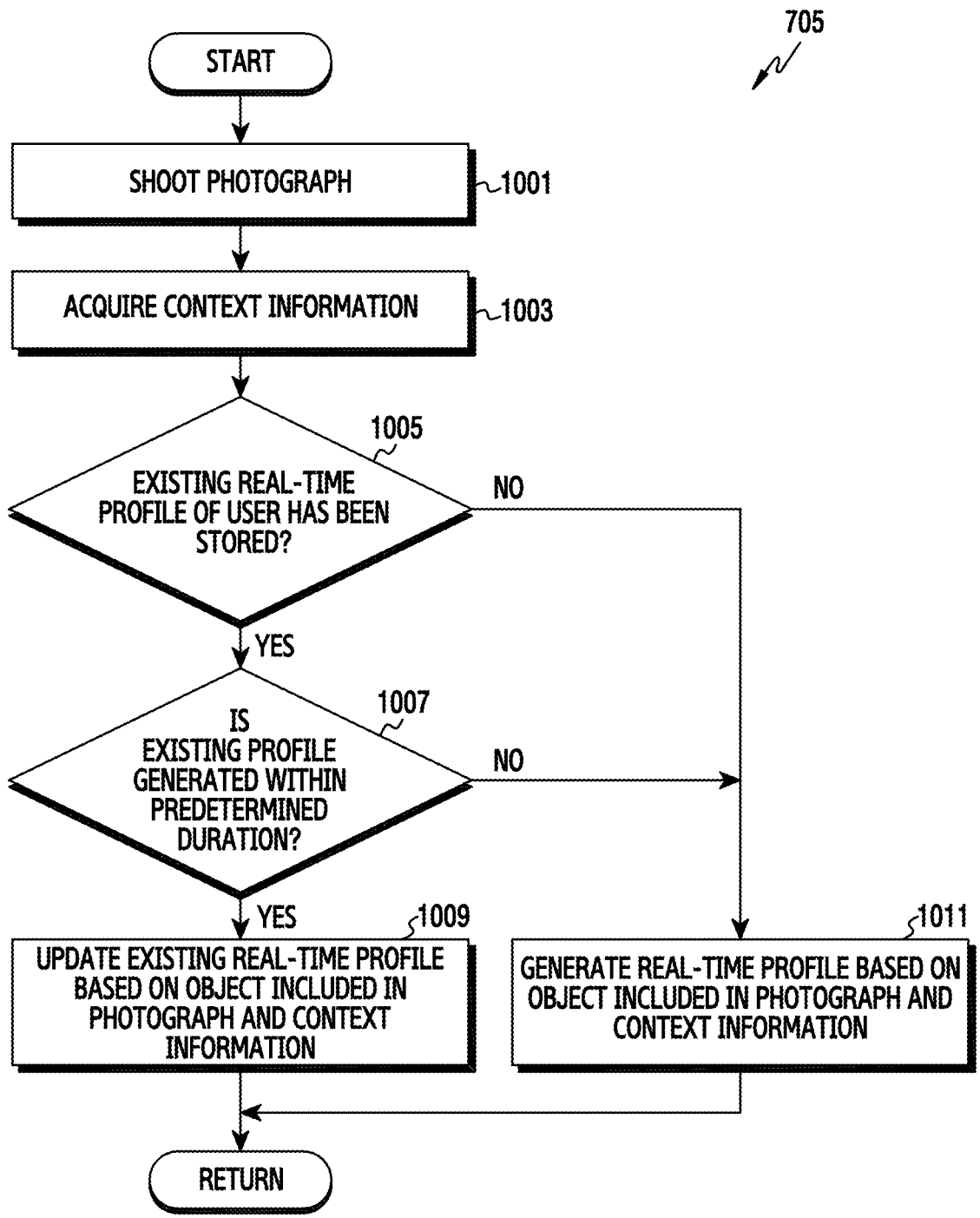
FIG. 10A is a flowchart illustrating a method of generating real-time profile information according to an exemplary embodiment of the present disclosure.

FIG. 10A is a flowchart illustrating a method of generating the real-time profile information of FIG. 6 according to an exemplary embodiment of the present disclosure.

For ease of explanation, the below description uses the electronic device 400 to perform the operations of FIG. 10A. However, the present disclosure is not so limited.

Referring to FIG. 10A, in operation 1001, the electronic device 400 may shoot a photograph. In an exemplary embodiment, the electronic device 400 may control the camera module 291 to shoot the photograph in response to a user's input, or in response to meeting a preset condition (e.g., expiration of a timer).

In operation 1003, the electronic device 400 may acquire context information. The context information may be information regarding the surrounding or the environment of the electronic device 400 when the photograph was taken.

Figure 10B:
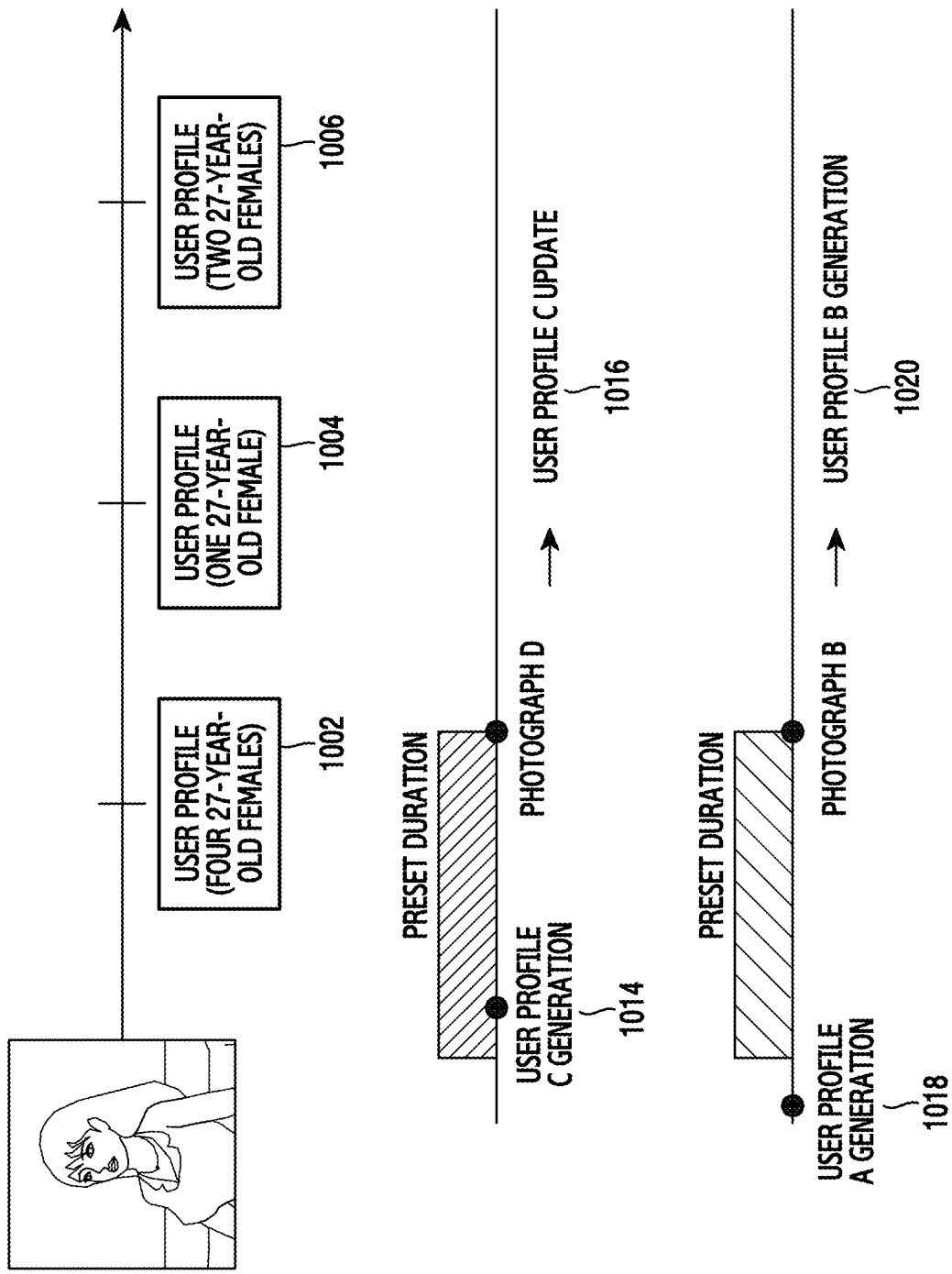
FIG. 10B is a diagram illustrating a change of a real-time profile according to an exemplary embodiment of the present disclosure.

In operation 1005, the electronic device 400 may check whether an existing real-time profile has been stored. In an exemplary embodiment, real-time profile information may be information indicating a user state or context when the photograph was taken. The existing real-time profile may be updated according to the operations described later, or be newly generated. For example, the real-time profile may be generated or replaced as shown in FIG. 10B. Since the real-time profile information is information indicating the user state or context when the photograph was taken, the real-time profile information may be generated or replaced whenever the user shoots a photograph. Referring to FIG. 10B, the user has shot three photographs, and whenever the electronic device 400 shoots the photographs, the electronic device 400 may generate or replace the real-time profile based on generated information on an object included in the photographs or context information of the photographs. For example, the electronic device 400 may generate and replace each of real-time profile information 1002 "four 27-year-old females," real-time profile information 1004 "one 27-year-old female," and real-time profile information 1006 "two 27-year-old females."

If the existing real-time profile has not been stored, in operation 1011, the electronic device 400 may generate new real-time profile information. In an exemplary embodiment, the electronic device 400 may generate the real-time profile information based on generated information on an object included in the photograph or context information of the photograph. The real-time profile information may include one or more items, and the one or more items included in the real-time profile information may include information on a user characteristic, information on weather, information on a position, etc.

If the existing real-time profile has been stored, in operation 1007, the electronic device 400 may check whether the existing real-time profile has been generated within a predetermined duration. In other words, the electronic device 400 may check if the existing real-time profile is out of date.

If the difference in the generation times of the existing real-time profile and the photograph is less than the predetermined duration, in operation 1009, the electronic device 400 may update the existing real-time profile. In an exemplary embodiment, the electronic device 400 may update the existing real-time profile based on at least one of information on an object included in the shot photograph of operation 1001 or received context information. For example, referring to FIG. 10B, in case where the electronic device 400 has shot a photograph D on Oct. 18, 2016, 20:00, since a real-time profile (e.g., the existing real-time profile C 1014) generated within the predetermined duration exists, the electronic device 400 may update (1016) the existing real-time profile C. The updating of the existing real-time profile C may be based on at least one of a shot photograph (i.e., the photograph C) or the existing photograph (i.e., a photograph D). The electronic device 400 may include, in an updated real-time profile B', information on an object that has been included in the existing photograph C but has not been included in the shot photograph D. The electronic device 400 may include, in the updated real-time profile B', information on an object that has not been included in the existing photograph C but has been included in the shot photograph D.

In an exemplary embodiment, the electronic device 400 may update the existing real-time profile information so that there are not conflicts with the existing real-time profile information. For example, in case where the existing real-time profile information A has been determined as "user—32-year-old male, companion—33-year-old female, and relation information—couple", if objects '32-year-old male' and '5-year-old female' have been included in the shot photograph, the electronic device 400 may update the existing real-time profile information A into "user—32-year-old male, companion—33-year-old female, 5-year-old female, and relation information—family".

When determining whether there are the conflicts with the existing real-time profile information, the electronic device 400 may consider a tolerance range dependent on the characteristics of an item included in the real-time profile information. For example, the electronic device 400 may set a relatively wide tolerance range for "age," since the "age" is an item whose detection may be inaccurate, depending on various factors such as shot angle, direction of the face facing a camera, etc. In case where the information is within the set tolerance range, the electronic device 400 may determine that there are no conflicts with the existing real-time profile information.

If the difference of the generation time of the existing real-time profile and the photograph shot time is larger than the predetermined duration, the electronic device 400 may perform operation 1011, similarly with when the existing real-time profile has not been stored in operation 1005. That is, in case where the existing real-time profile has been stored, and the existing real-time profile has been generated within the predetermined duration, the electronic device 400 may update the existing real-time profile. But, if the existing real-time profile has been stored but the existing real-time profile has not been generated within the predetermined duration, the electronic device 400 may generate new real-time profile information. For example, referring to FIG. 10B, assume that the predetermined duration is 3 hours, and the electronic device 400 has generated the real-time profile A on Oct. 18, 2016, 15:00 (1018). In this case, when the electronic device 400 shoots the photograph B on Oct. 18, 2016, 19:00, the electronic device 400 may generate a new real-time profile B (1020), because the existing real-time profile does not exist within the predetermined duration. At this time, the electronic device 400 may generate the real-time profile information based on the shot photograph B or context information related to the photograph B.

Though not illustrated, in an exemplary embodiment, the electronic device 400 may store, in a memory, the generated real-time profile information or the updated real-time profile information.

Though not illustrated, in an exemplary embodiment, the electronic device 400 may consider spatial differences, in place of or in addition to temporal differences, in determining whether to update or replace the real-time profile information. For example, the electronic device 400 may determine to update the real-time profile information when the location context information for the shot photograph is within in predetermined range of the location where the photograph for the existing real-time profile information was shot. On the other hand, if the location context information for the shot photograph is outside the predetermined range, the real-time profile information may be replaced, as shown in step 1011 in FIG. 10A.

In accordance with the aforementioned various exemplary embodiments, the electronic device 400 may provide a recommendation for a location to a user based on real-time profile information, base profile information, anonymized data, etc. At this time, in accordance with other exemplary embodiments, the recommendation for the location may be provided on the basis of a part of the real-time profile information, the base profile information and/or the anonymized data. Also, in addition to the location, additional other information may be provided together. Various exemplary embodiments are explained with reference to FIG. 11A to FIG. 14B below.

Figure 11A:
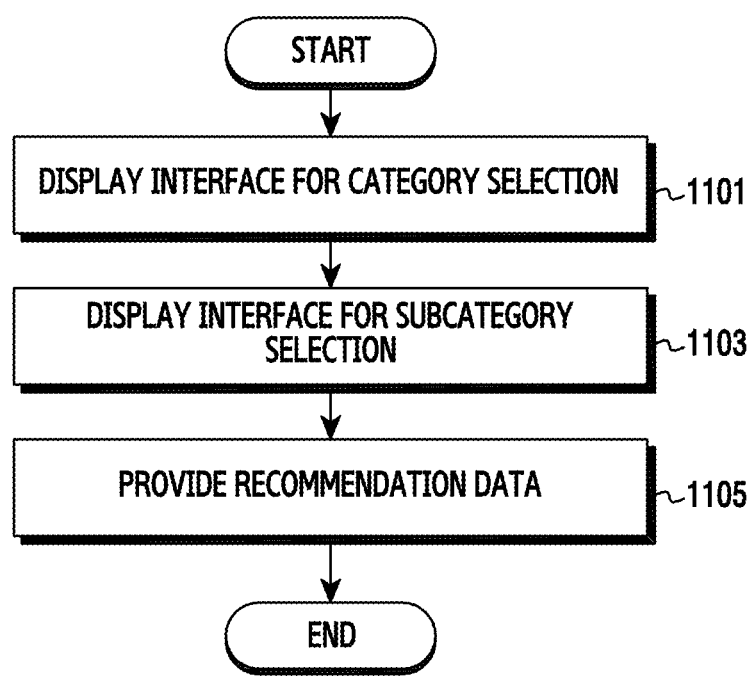
FIG. 11A is a flowchart illustrating a method of providing a recommended location in real-time using anonymized data according to an exemplary embodiment of the present disclosure.

FIG. 11A is a flowchart illustrating a method of providing a recommended location in real-time using anonymized data according to an exemplary embodiment of the present disclosure.

For ease of explanation, the below description uses the electronic device 400 to perform the operations of FIG. 11A in conjunction with the server 420 or second server 424. However, the present disclosure is not so limited.

FIG. 11A illustrates an exemplary embodiment providing a recommended location based on anonymized data without a user profile. In other words, FIG. 11A illustrates a method for providing, by the electronic device 400, the result to a user based on recommended location data received from the server 420. The recommended location data may not be based on the user's profile. For example, when the user's profile has not been stored, the electronic device 400 may generate user request data based on only a location request from the user and transmit the same to the server 420. The electronic device 400 may then receive, from the server 420, recommended location data based on the user request data. The user request data indicates one or more variables and values that are used by to the server 420 to generate recommended location data. The variables and values may be related to the user's characteristics or the context of the electronic device 400.

Figure 11B:
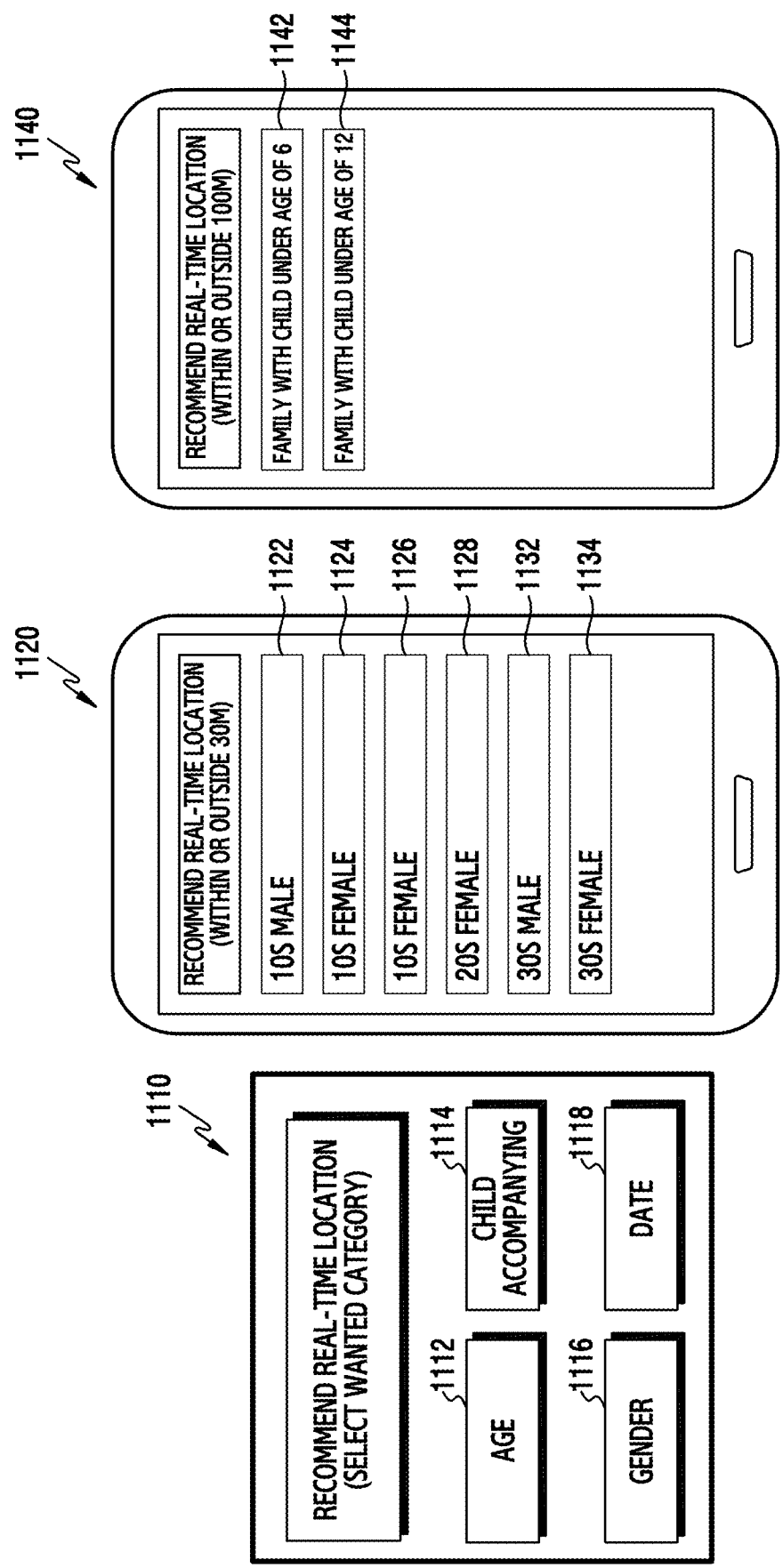
FIG. 11B is a diagram of interfaces for providing a recommended location in real-time using anonymized data according to an exemplary embodiment of the present disclosure.

Referring to FIG. 11A, in operation 1101, the electronic device 400 may display an interface for category selection. Before providing the recommended location data to a user, the electronic device 400 may provide the user with an interface of FIG. 11B for receiving an input of a selection of one or more categories. Referring to FIG. 11B, a screen 1110 may include interface constituent elements indicating categories such as "age" 1112, "child accompanying" 1114, "gender" 1116, "date" 1118, etc.

In operation 1103, the electronic device 400 may display an interface for a selection of a subcategory. In other words, when the electronic device 400 receives a selection of any one of categories from the user, the electronic device 400 may display, on a screen, detailed data on the selected category.

Here, the subcategory may be determined according to main categories selected by the user. For example, when the user selects the categories such as the "age" 1112 and the "gender" 1116, the subcategory may include "10's male" 1122, "10's female" 1124, "20's male" 1126, "20's female" 1128, "30's male" 1132 or "30's female" 1134 may be displayed, as shown in the screen 1120 of FIG. 11B. For another example, when the user selects the category "child accompanying" 114, the subcategory may include "family with a child under the age of 6" 1142 and/or "family with a child under the age of 12" 1144 as shown in the screen 1140 of FIG. 11B.

In operation 1105, the electronic device 400 provides recommendation data corresponding to the selected category and the selected subcategory. In an exemplary embodiment, in response to the selection of the subcategory from the user, the electronic device 400 may extract information corresponding to the selected subcategory from the recommended location data received from the server 420.

In an exemplary embodiment, in response to the selection of the subcategory from the user, the electronic device 400 may generate user request data. The user request data indicates one or more variables and values that are used by to the server 420 to generate recommended location data. For example, when the electronic device 400 receives the selection of the subcategory "10's male" 1122 from the user, the electronic device 400 may generate user request data including a condition of "age—10 to 19 and gender—male," and transmit the generated user request data to the server 420. The electronic device 400 may receive recommended location data corresponding to the transmitted user request data and display the same on its screen.

In an exemplary embodiment, in case where recommended location data according to the content of the subcategory selected from the user does not exist, or recommended location data includes an insufficient number of locations, the electronic device 400 may provide a notification message to the user. For example, the electronic device 400 may display the notification message of "there is no recommended location within 100 m of the current position" on the screen. The electronic device 400 may further display, on the screen, a notification message of "Would you set a new search range?"

Figure 12A:
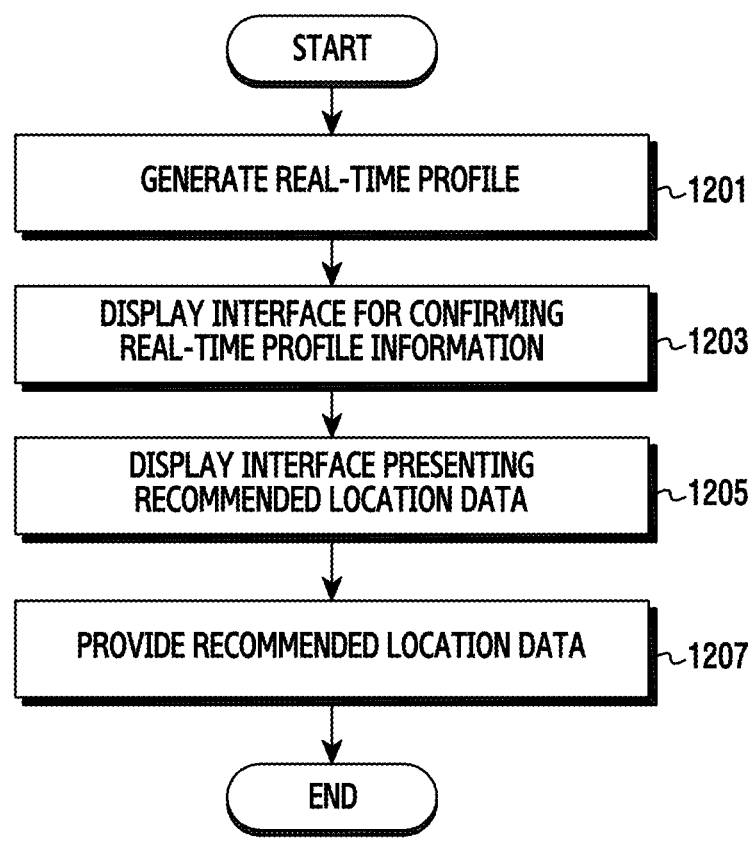
FIG. 12A is a flowchart illustrating a method of providing a recommended location based on a user's profile according to an exemplary embodiment of the present disclosure.

FIG. 12A is a flowchart illustrating a method of providing a recommended location based on a user's profile according to an exemplary embodiment of the present disclosure.

For ease of explanation, the below description uses the electronic device 400 to perform the operations of FIG. 12A in conjunction with the server 420 or second server 424. However, the present disclosure is not so limited.

Referring to FIG. 12A, in operation 1201, the electronic device 400 may generate a real-time profile. For example, the electronic device 400 may generate real-time profile information based on information on objects in a captured photograph or context information of the photograph. In an exemplary embodiment, the real-time profile information may be information indicating a user state or context when the photograph was taken. In an exemplary embodiment, the real-time profile information may include one or more items, and the one or more items may include information on a user characteristic (e.g., age, gender, relation information, etc.), information on weather, information on a position, etc. For example, the electronic device 400 may generate real-time profile information such as "user—35-year-old female, companion—33-year-old male, 3-year-old female, 2-year-old male, and weather—rain".

Figure 12B:
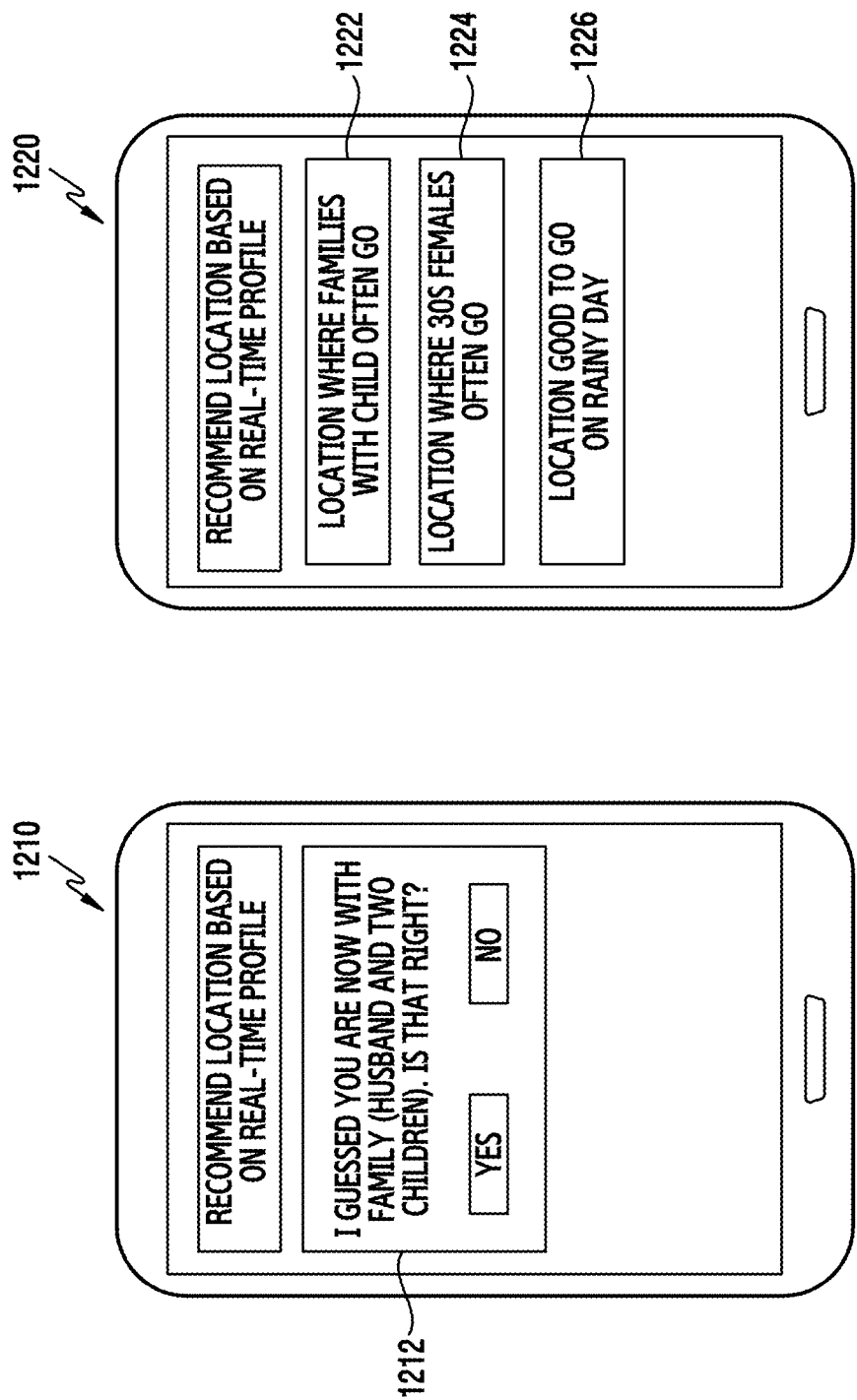
FIG. 12B is a diagram of interfaces for providing a recommended location based on a user's profile according to an exemplary embodiment of the present disclosure.

In operation 1203, the electronic device 400 may display an interface for confirming the real-time profile information. For example, as shown in FIG. 12B, the electronic device 400 may display a screen 1210 including a message 1212 of confirming to the user whether the generated real-time profile information is accurate. For example, the electronic device 400 may display the confirmation message such as "I guessed you are now with your family (husband and two children). Is that right?"

In operation 1205, the electronic device 400 may display an interface of presenting recommended location data. That is, the electronic device 400 may generate a plurality of recommended location candidates based on the real-time profile information confirmed in operation 1203, and may display a screen of inquiring a selection of one of the recommended location candidates. For example, the electronic device 400 may generate user request data based on the user's current state, i.e., the real-time profile, and transmit the same to the server 420, and may receive data on various recommended location candidates and provide the same to the user. As shown in FIG. 12B, the electronic device 400 may display a screen 1220 including one or more recommended location candidates 1222, 1224 and 1226. The one or more recommended location data may be determined based on the whole or part of the user's real-time profile. For example, "location where families with a child often go" 1222 may be recommended location data determined based on only the item "the existence or non-existence of a child" in the user's real-time profile. For another example, "location where 30's females often go" 1224 may be recommended location data determined based on only the age and the gender of the user, and "location good to go on a rainy day" 1226 may be recommended location data determined based on only the weather information in the real-time profile.

The electronic device 400 may detect the fact that the current context (e.g., current time or position, etc.) corresponds to a predetermined trigger event, and may generate user request data to be transmitted to the server 420 automatically without user input. The user request data, as explained above, may be based on the user's profile and/or the condition of the trigger event (e.g., information on a current position and current time, information on road conditions, etc.). As an exemplary embodiment, a method of providing recommendation information based on a trigger event using a navigation service is described below.

Figure 13A:
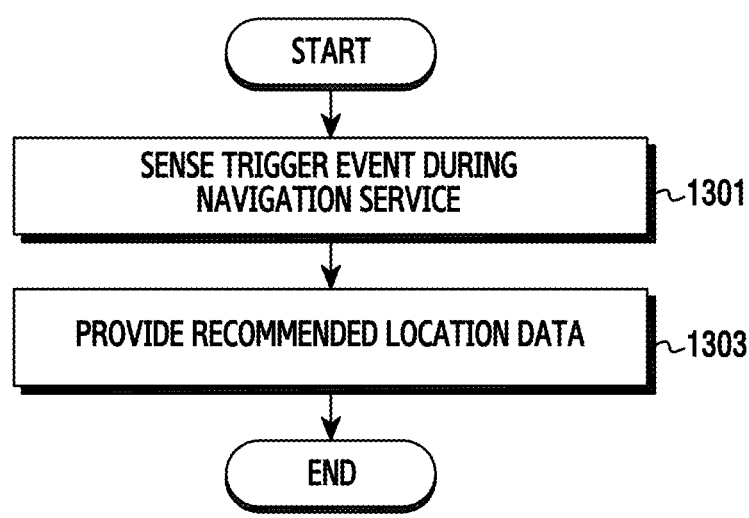
FIG. 13A is a flowchart illustrating a method of providing a recommended location in link with navigation according to an exemplary embodiment of the present disclosure.

FIG. 13A is a flowchart illustrating a method of providing a recommended location in link with navigation according to an exemplary embodiment of the present disclosure.

For ease of explanation, the below description uses the electronic device 400 to perform the operations of FIG. 13A in conjunction with the server 420 or second server 424. However, the present disclosure is not so limited.

Referring to FIG. 13A, in operation 1301, the electronic device 400 may sense the occurrence of a trigger event during a navigation service. For example, referring to FIG. 13B, the electronic device 400 may display a route guide information screen 1310 provided in the navigation service to the user. The electronic device 400 may then detect the fact that the current context corresponds to a predetermined trigger event (e.g., the current time is approaching at 6 o'clock PM and the user is stuck in traffic).

In operation 1303, the electronic device 400 may provide recommendation data. For this, the electronic device 400 may generate user request data to be transmitted to the server 420 based on the user's profile and/or information related to the trigger event. For example, the user request data may be "restaurant for a 20's couple to have a dinner on a rainy day." The electronic device 400 may then receive recommended location data corresponding to the user request data from the server 420, and display a screen 1310 or 1320 including recommended location information 1312 or 1322. For example, the electronic device 400 may display icons 1314 or 1324 indicating the recommended locations on the map used for provide navigation service. The electronic device 400 may further display descriptions for the recommended locations. As shown in screens 1310 and 1320, in one embodiment, an additional user input is required to display the descriptions.

Figure 13B:
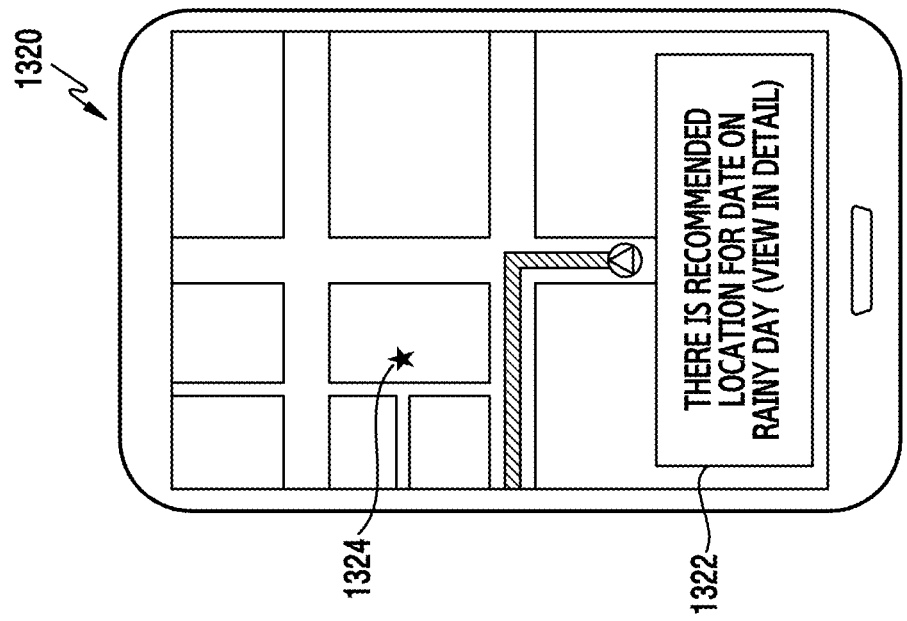
FIG. 13B is a diagram of interfaces for providing a recommended location in link with navigation according to an exemplary embodiment of the present disclosure.
Figure 13B:
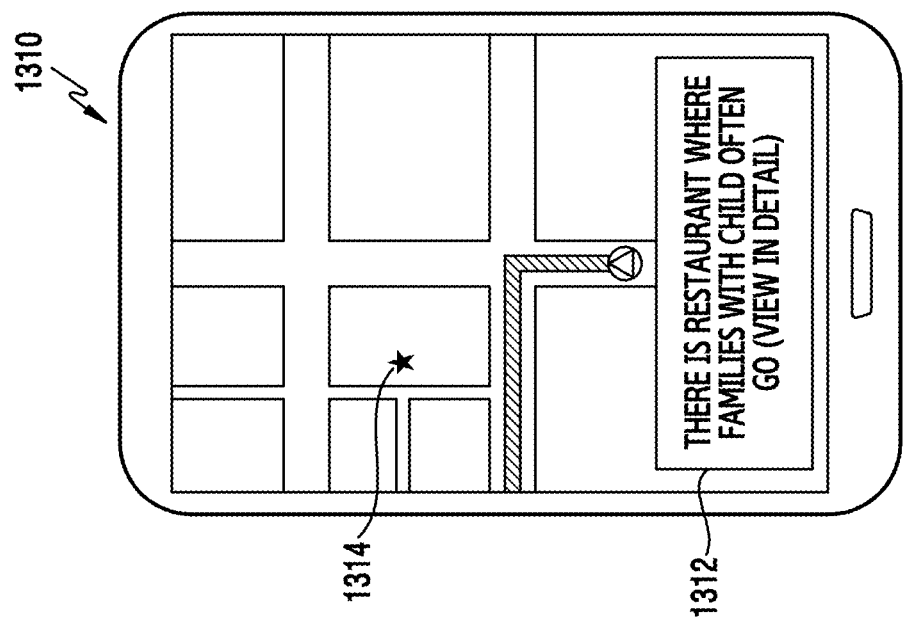

The operations shown in FIG. 13A and FIG. 13B may be achieved by additionally considering the purpose of the user's movements, such as whether the user is commuting, on a business trip, on vacation, etc. The purpose of the user's movements may be determined based on how far the user has travelled from his home or work, the starting time of the movement, the nature of the destination, travel distance between origin and destination, etc. For example, when the user is 50 km from his home or work address, and the destination is a theme park, it may be determined that the user is on vacation. Accordingly, the recommended location data may be provided depending on the purpose of the user's movement. For example, if it is determined that the user is on vacation, when the current time approaches 18:00, restaurants near the current location may be recommended. However, if it is determined that the user is on his way to meeting, such that he must arrive at his destination by a certain time, when the current time approaches 18:00, no restaurant recommendations may be made.

Figure 14A:
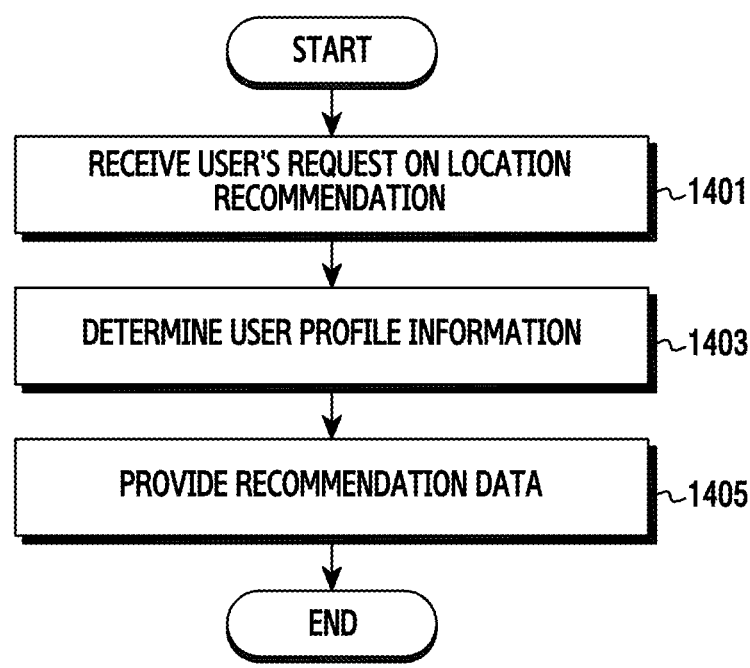
FIG. 14A is a flowchart illustrating a method of providing a recommended travel route based on a user's profile according to an exemplary embodiment of the present disclosure.
Figure 14B:
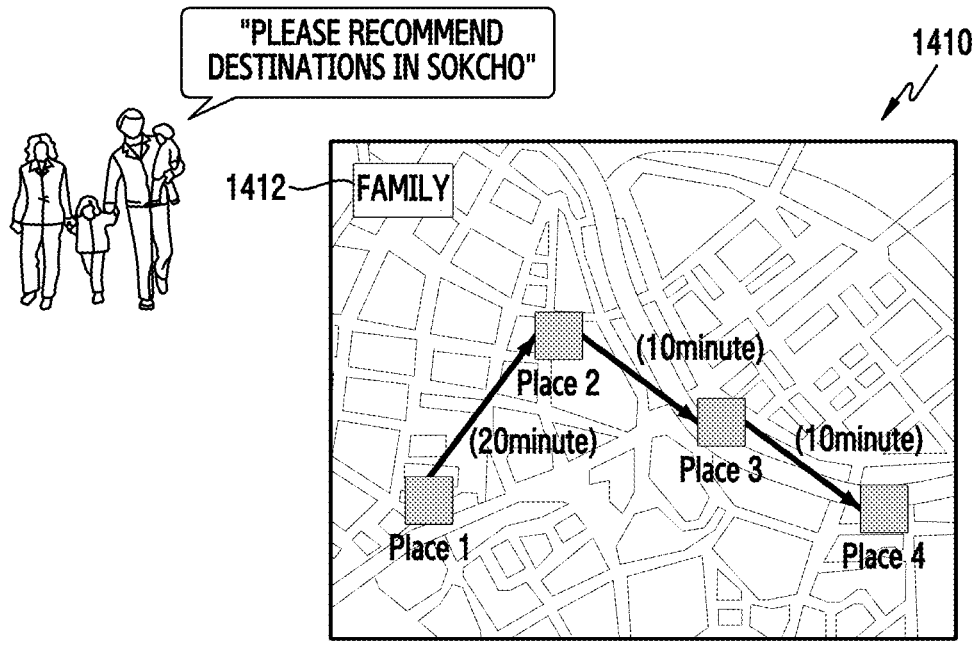
FIG. 14B is a diagram of interfaces for providing a recommendation travel route based on a user's profile according to an exemplary embodiment of the present disclosure.
Figure 14B:
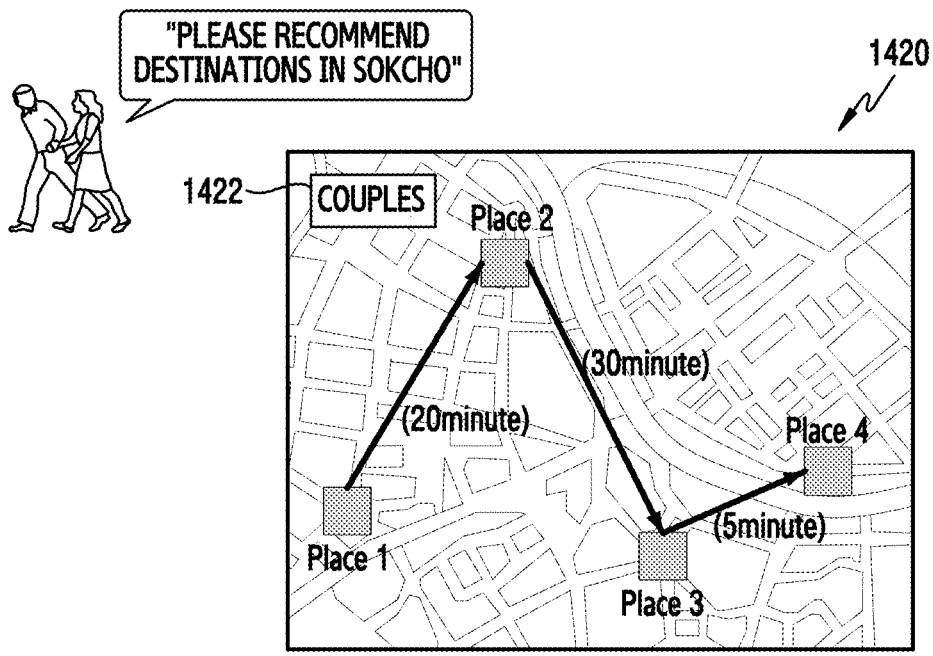

FIG. 14A is a flowchart illustrating a method of providing a recommended travel route based on a user's profile according to an exemplary embodiment of the present disclosure.

For ease of explanation, the below description uses the electronic device 400 to perform the operations of FIG. 14A in conjunction with the server 420 or second server 424. However, the present disclosure is not so limited.

Referring to FIG. 14A, in operation 1401, the electronic device 400 may receive a request on location recommendation or route from a user. At this time, the request may be inputted in various forms. For example, as in FIG. 14B, the electronic device 400 may receive a command or request "Please recommend travel destinations in Sokcho" from the user. The electronic device 400 may receive the command or request through sound applications such as Chatbot, as well as a text.

In operation 1403, the electronic device 400 may determine user's profile information. The user's profile information may include real-time profile information and/or base profile information.

Thereafter, in operation 1405, the electronic device 400 may provide recommendation data. In detail, the electronic device 400 may generate user request data to be transmitted to the server 420 based on the request received from the user and/or the user's profile information. The electronic device 400 may receive recommended location data corresponding to the user request data from the server 420, and display the same on a screen. In an exemplary embodiment, the recommended location data may be a travel route.

In an exemplary embodiment, the travel route may be different depending on the user's profile. Although the electronic device 400 receives the same request on location recommendation, the electronic device 400 may generate user request data differently depending on the user's profile. Therefore, the electronic device 400 may receive different recommended routes from the server 420. For example, a user whose profile indicates a family with children may be provided with a route such one shown in screen 1410 of FIG. 14B. However, a user whose profile indicates a couple may be provided with a route shown in screen 1420 of FIG. 14B.

The places 1-4 in screen 1410 may be more appropriate for families, while the places 1-4 in screen 1420 may be more appropriate for couples.

The electronic device 400 may further display movement distances between one or more travel destinations included in the routes. In another exemplary embodiment, the electronic device 400 may further display the basis or keyword for route determination. For example, in FIG. 14B, the screen 1410 may additionally display the keyword "family" 1412, and the screen 1420 may display the keyword "couples" 1422.

A system according to one exemplary embodiment of the present disclosure may include a network interface, at least one processor, and at least one storage device. The storage device may store instructions that enables the processor to receive, through the network interface, a plurality of photographs capturing one or more objects and position information associated with each of the plurality of photographs, identify the one or more objects from the plurality of photographs, and transmit information on the identified one or more objects and the position information to an external device.

According to one exemplary embodiment, the one or more objects may include faces of one or more persons captured in the plurality of photographs.

According to one exemplary embodiment, the information on the identified one or more objects may include at least one of ages of the one or more persons, genders of the one or more persons, a number of faces, and relations between the one or more persons.

According to one exemplary embodiment, the storage device may further store instructions that enable the processor to, before transmitting the information on the identified one or more objects to the external device, eliminate personal information among the information on the identified one or more objects.

According to one exemplary embodiment, the storage device may further store instructions that enable the processor to transmit information on the identified one or more objects except the personal information to the external device.

According to one exemplary embodiment, the storage device may further store context information for each of the plurality of photographs.

According to one exemplary embodiment, the context information may include at least one of weather information in an environment of each of the plurality of photographs, a time at which each of the plurality of photographs was captured, a place where each of the plurality of photographs was captured, and a frequency.

A system according to one exemplary embodiment of the present disclosure may include a network interface, at least one processor, and at least one storage device. The storage device may store instructions that enabled the processor to receive profile information of a user through the network interface, at least temporarily store the profile information, receive, through the network interface, user request data requesting a location recommendation for the user, compare information on one or more objects, provided from an external device, with at least a portion of the profile information, generate the location recommendation based on the comparison and the user request data, and provide the location recommendation to the user through the network interface.

According to one exemplary embodiment, the one or more objects may include faces of one or more persons captured in a plurality of photographs.

According to one exemplary embodiment, the information on the one or more objects may include at least one of ages of the one or more persons, genders of the one or more persons, a number of faces, and relations between the one or more persons.

According to one exemplary embodiment, the profile information of the user may include at least one of an age of the user, a gender of the user, and a family relation of the user.

According to one exemplary embodiment, the storage device may further store instructions that enable the processor to receive information on the user's context, where the information on the user's context may include at least one of weather information in an environment of the user, a time at which a photograph was captured by the user, a place where the photograph was captured by the user, and a frequency.

According to one exemplary embodiment, the profile information of the user may be received after the user request data is received.

According to one exemplary embodiment, the user request data may be based on at least one of the profile information of the user and a request on location recommendation from the user.

An electronic device according to one exemplary embodiment of the present disclosure may include a display displaying a user interface, a network interface configured to communicate with an external server, at least one processor electrically coupled with the display and the network interface, and at least one storage device electrically connected with the processor. The storage device may store instructions that enable the processor to determine profile information of a user based on at least one photograph captured by the user, at least temporarily store the profile information in the at least one storage device, receive a request on location recommendation from the user through the user interface, in response to the request, generate user request data to be transmitted to the external server, where the user request data is generated at least partially based on the profile information of the user, transmit the generated user request data to the external server through the network interface, receive a recommendation from the external server through the network interface, where the recommendation is related to the transmitted user request data, and provide the received recommendation to the user through the user interface.

According to one exemplary embodiment, the profile information of the user may include at least one of an age of the user, a gender of the user, and a family relation of the user.

According to one exemplary embodiment, the profile information may be determined based on at least one of real-time profile information indicating a user state or context when the at least one photograph was captured and base profile information generated from photographs previously captured by the user.

According to one exemplary embodiment, the real-time profile may be generated based on at least one of information on at least one object captured in the at least one photograph and context information for the at least one photograph.

According to one exemplary embodiment, the context information may include at least one of weather information in an environment of the least one photograph, a time at which the at least one photograph was captured, a place where the at least one photograph was captured, and a frequency.

A method for operating in an electronic device according to one exemplary embodiment of the present disclosure may include capturing at least one photograph, determining profile information of a user based on the at least one photograph, at least temporarily storing the profile information of the user in at least one storage device, receiving a request on location recommendation from the user through a user interface, in response to the request, generating user request data to be transmitted to an external server, where the user request data is generated at least partially based on the profile information of the user, transmitting the generated user request data to the external server through a network interface, receiving a recommendation from the external server through the network interface, where the recommendation is related to the transmitted user request data, and providing the received recommendation to the user through the user interface.

According to one exemplary embodiment, the profile information of the user may include at least one of an age of the user, a gender of the user, and a family relation of the user.

According to one exemplary embodiment, the profile information may be determined based on at least one of real-time profile information indicating a user state or context when the at least one photograph was captured and base profile information generated from photographs previously captured by the user.

According to one exemplary embodiment, the real-time profile may be generated based on at least one of information on at least one object captured in the at least one photograph and context information for the at least one photograph.

According to one exemplary embodiment, the context information may include at least one of weather information in an environment of the least one photograph, a time at which the at least one photograph was captured, a place where the at least one photograph was captured, or a frequency.

The term "module" used in the present document may include a unit consisting of hardware, software or firmware and, for example, may be used interchangeably with the term "logic," "logic block," "component," "circuit" or the like. The "module" may be implemented mechanically or electronically and, for example, may include an application-specific integrated circuit (ASIC) chip, field-programmable gate arrays (FPGAs), or a programmable logic device, which have been known or will be developed in future, performing some operations. At least a part of an apparatus (e.g., modules or functions thereof) or method (e.g., operations) according to various exemplary embodiments may be implemented as an instruction that has been stored in a computer-readable storage media in the form of a program module. In case where the instruction will be executed by a processor (e.g., processor 120), the processor may perform a function corresponding to the instruction. The computer-readable recording media may include a hard disk, a floppy disk, a magnetic media (e.g., a magnetic tape), an optical recording media (e.g., a compact disk-read only memory (CD-ROM) and/or a digital versatile disk (DVD)), a magneto-optical media (e.g., a floptical disk), an internal memory, etc. The instruction may include a code that is made by a compiler or a code that is executable by an interpreter. A module or program module according to various exemplary embodiments may further include at least one or more of the aforementioned constituent elements, or omit some, or further include another constituent element. Operations carried out by a module, a program module or another constituent element according to various exemplary embodiments may be executed in a sequential, parallel, repeated or heuristic manner, or at least some operations may be executed in different order or may be omitted, or another operation may be added.

While a concrete exemplary embodiment has been described in a detailed description of the present disclosure, it is undoubted that various modifications may be made without departing from the scope of the present disclosure. Therefore, the scope of the present disclosure should not be limited and defined to the described exemplary embodiment and should be defined by not only claims described later but also equivalents to these claims.

Aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

A method according to various exemplary embodiments and an electronic device thereof are to provide location information suitable to user's context and, based on context information and an user's profile, may provide a location where actual users having profiles similar with the user's profile often go, thereby providing more suitable recommended location data to a user.

What is claimed is:

1. A system comprising:
   a network interface;
   at least one processor; and
   at least one storage device,
   wherein the storage device stores instructions executable by the processor to:
   receive a photograph and extract profile information of a first user based on one or more objects depicted in the photograph and contextual information of the photograph, indicating at least one of a characteristic of a person depicted in the photograph and environmental information of an environment depicted in the photograph,
   receive anonymized data of a second user through the network interface, wherein the anonymized data of the second user is generated by removing personal information of the second user and includes at least a location information of the second user,
   at least temporarily store the profile information and the anonymized data,
   receive, through the network interface from a first mobile device of the first user, a request for a location recommendation for the first user,
   execute a search request generated from the photograph by comparing information at least one of the contextual information and the one or more objects of the photograph with at least the anonymized data of the second user, generate the location recommendation based on the comparison; and provide the location recommendation to the first mobile device through the network interface.

2. The system of claim 1, wherein the one or more objects comprise faces of one or more persons within one or more photographs comprising the one or more objects.

3. The system of claim 2, wherein the information on the one or more objects comprises at least one of ages of the one or more persons within the one or more photographs, genders of the one or more persons, a number of faces, and relations between the one or more persons.

4. The system of claim 1, wherein the profile information of the first user comprises at least one of age of the first user, gender of the first user, and family relation of the first user, and wherein the anonymized data of the second user comprises at least one of age of the second user, gender of the second user, and family relation of the second user.

5. The system of claim 1, wherein the storage device further stores instructions executable by the processor to receive information of a user context, wherein the information of the user context comprises at least one of weather information in environment of the users, time at which photographs were captured by the users, places where the photographs were captured by the users.

6. The system of claim 1, wherein the profile information of the first user and the anonymized data of the second user are received after the request is received.

7. The system of claim 1, wherein the request is based on at least one of the profile information of the first user and the request for a location recommendation for the first user.

8. An electronic device comprising:
a display displaying a user interface;
a network interface configured to communicate with an external server;
at least one processor electrically coupled with the display and the network interface; and
at least one storage device electrically connected with the processor,
wherein the storage device stores instructions executable by the processor to,
extract profile information of a first user from at least one photograph captured by the first user, based on one or more objects depicted in the photograph and contextual information of the photograph, indicating at least one of a characteristic of a person depicted in the photograph and environmental information of an environment depicted in the photograph,
at least temporarily store the profile information in the at least one storage device,
receive a request on location recommendation from the first user through the user interface,
in response to the request, generate a search request to be transmitted to the external server, wherein the user request data is generated at least partially based on the photograph from which the profile information of the first user is extracted,
transmit the generated user request data to the external server through the network interface, wherein the external server executes the search request generated from the photograph by comparing information at least one of the contextual information and the one or more objects of the photograph with anonymized data of a second user stored on the external server,
receive a recommendation from the external server through the network interface, wherein the recommendation is related to the transmitted user request data and the anonymized data of the second user, wherein the anonymized data of the second user is generated by removing personal information of the second user and includes at least a location information of the second user, and
display, on the display, the received recommendation through the user interface.

9. The electronic device of claim 8, wherein the profile information of the first user comprises at least one of an age of the first user, a gender of the first user, and a family relation of the first user.

10. A method for operating in an electronic device, the method comprising:
capturing at least one photograph by a first user,
extracting profile information of the first user from the photograph based on the at least one photograph based on one or more objects depicted in the photograph and contextual information of the photograph, indicating at least one of a characteristic of a person depicted in the photograph and environmental information of an environment depicted in the photograph,
at least temporarily storing the profile information of the first user in at least one storage device,
receiving a request on location recommendation from the first user through a user interface,
in response to the request, generating a search request to be transmitted to an external server, wherein the user request data is generated at least partially based on the photograph from which the profile information of the first user is extracted,
transmitting the generated user request data to the external server through a network interface, wherein the external server executes the search request generated from the photograph by comparing information at least one of the contextual information and the one or more objects of the photograph with anonymized data of a second user stored on the external server,
receiving a recommendation from the external server through the network interface, wherein the recommendation is related to the transmitted user request data and the anonymized data of the second user stored on the external server, wherein the anonymized data of the second user is generated by removing personal information of the second user and includes at least a location information of the second user, and
displaying, on the display, the received recommendation through the user interface.

11. The system of claim 1, wherein the anonymized data includes data from a plurality of users including the second user, and
wherein the location recommendation includes a first set of locations depicted within at least threshold number of photographs included in the anonymized data, and excludes a second set of locations depicted within less than the threshold number of photographs included in the anonymized data.

12. The electronic device of claim 8, wherein the anonymized data includes data from a plurality of users including the second user, and
wherein the location recommendation includes a first set of locations depicted within at least threshold number of photographs included in the anonymized data, and excludes a second set of locations depicted within less than the threshold number of photographs included in the anonymized data.

13. The method of claim 10, wherein the anonymized data includes data from a plurality of users including the second user, and
    wherein the location recommendation includes a first set of locations depicted within at least threshold number of photographs included in the anonymized data, and excludes a second set of locations depicted within less than the threshold number of photographs included in the anonymized data.

* * * * *